United States Patent
Girvin et al.

(10) Patent No.: US 12,206,280 B1
(45) Date of Patent: *Jan. 21, 2025

(54) POWER STEALING IN RELAY CIRCUITS

(71) Applicant: Amazon Technologies, Inc., Seattle, WA (US)

(72) Inventors: Samuel Forest Girvin, San Francisco, CA (US); Paul Joseph Schaffert, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,992

(22) Filed: May 25, 2023

Related U.S. Application Data

(63) Continuation of application No. 16/714,056, filed on Dec. 13, 2019, now Pat. No. 11,742,692.

(51) Int. Cl.
| | |
|---|---|
| *F24F 11/00* | (2018.01) |
| *F24F 11/46* | (2018.01) |
| *G06F 1/26* | (2006.01) |
| *H02J 7/00* | (2006.01) |
| *H02J 9/06* | (2006.01) |

(Continued)

(52) U.S. Cl.
CPC .............. *H02J 9/06* (2013.01); *G06F 1/26* (2013.01); *H02J 7/007* (2013.01); *H02M 7/2176* (2013.01); *H02M 5/2573* (2013.01)

(58) Field of Classification Search
CPC . G08B 3/10; G08B 13/19636; H02M 1/0032; H02M 1/008; H02M 7/02; H02M 7/06; H02M 7/217; H02M 7/064; H02M 7/2176; H02M 5/2573; Y02B 70/10; Y02B 10/20; Y02B 10/70; B01D 46/0086; G05B 15/02; G05D 23/19; G05D 23/1902; G05D 23/1917; Y10T 29/49826; H02J 9/06; H02J 7/007; G06F 1/26

See application file for complete search history.

(56) References Cited

U.S. PATENT DOCUMENTS

| | | |
|---|---|---|
| 5,303,143 A | 4/1994 | Sommer et al. |
| 8,770,491 B2 | 7/2014 | Warren et al. |
| 9,605,858 B2 | 3/2017 | Warren et al. |

(Continued)

OTHER PUBLICATIONS

Office Action for U.S. Appl. No. 16/714,056, mailed on Sep. 15, 2022, Girvin, "Power Stealing in Relay Circuits", 9 pages.

(Continued)

*Primary Examiner* — Elim Ortiz
(74) *Attorney, Agent, or Firm* — Lee & Hayes, P.C.

(57) ABSTRACT

Techniques for an electronic device to perform power-stealing techniques to harvest energy from a power-control circuit to power components of the electronic device. In some examples, the electronic device may be connected in the power-control circuit between a power supply and a relay that is selectively configured to activate a power load. According to the techniques described herein, the electronic device may include voltage-drop circuitry that is connected in the power-control circuit such that a voltage drop is produced across electrical components of the electronic device while the relay is in the activated, or triggered, state. In this way, the electronic device may perform power-stealing from the power-control circuit while the relay is maintained in the activated state.

20 Claims, 12 Drawing Sheets

(51) Int. Cl.
*H02M 7/217* (2006.01)
*H02M 5/257* (2006.01)

(56) References Cited

U.S. PATENT DOCUMENTS

| | | |
|---|---|---|
| 9,620,991 B2 | 4/2017 | Simard et al. |
| 10,097,627 B1 | 10/2018 | Gafton et al. |
| 10,878,671 B1 | 12/2020 | Skeoch |
| 2003/0090243 A1 | 5/2003 | Atherton |
| 2007/0296280 A1 | 12/2007 | Sorg et al. |
| 2012/0126021 A1* | 5/2012 | Warren ................ H01R 9/2416 |
| | | 236/1 C |
| 2012/0325919 A1 | 12/2012 | Warren et al. |
| 2018/0119976 A1 | 5/2018 | Kadah et al. |

OTHER PUBLICATIONS

Office Action for U.S. Appl. No. 16/714,056, mailed on Mar. 3, 2022, Girvin, "Power Stealing in Relay Circuits", 10 pages.

\* cited by examiner

600

```
┌─────────────────────────────────────────────────────────────────┐
│ CAUSE A FIRST SWITCH TO OPEN TO PREVENT AC CURRENT FROM FLOWING │
│         THROUGH A FIRST CIRCUIT PATH OF AN ELECTRONIC DEVICE    │
│                               602                               │
└─────────────────────────────────────────────────────────────────┘
                                 │
                                 ▼
┌─────────────────────────────────────────────────────────────────┐
│   CAUSE ONE OR MORE SECOND SWITCHES TO OPEN TO PREVENT AC       │
│   CURRENT FROM FLOWING THROUGH A SECOND CIRCUIT PATH OF THE     │
│                       ELECTRONIC DEVICE                         │
│                               604                               │
└─────────────────────────────────────────────────────────────────┘
                                 │
                                 ▼
┌─────────────────────────────────────────────────────────────────┐
│  CAUSE THE FIRST SWITCH TO CLOSE SUCH THAT A SECOND AMOUNT OF AC│
│  CURRENT FLOWS THROUGH THE FIRST CIRCUIT PATH AND THE AC RELAY, │
│  THE SECOND AMOUNT OF AC CURRENT BEING ABOVE AN ENERGIZING      │
│                  THRESHOLD OF THE AC RELAY                      │
│                               606                               │
└─────────────────────────────────────────────────────────────────┘
                                 │
                                 ▼
┌─────────────────────────────────────────────────────────────────┐
│   CAUSE THE FIRST SWITCH TO OPEN TO PREVENT AC CURRENT FROM     │
│             FLOWING THROUGH THE FIRST CIRCUIT PATH              │
│                               608                               │
└─────────────────────────────────────────────────────────────────┘
                                 │
                                 ▼
┌─────────────────────────────────────────────────────────────────┐
│ CAUSE THE ONE OR MORE SECOND SWITCHES TO CLOSE TO RESULT IN AN  │
│ AC VOLTAGE PLACED ACROSS A VOLTAGE-DROP CIRCUITRY AND A POWER   │
│              LOAD OF THE ELECTRONIC DEVICE                      │
│                               610                               │
└─────────────────────────────────────────────────────────────────┘
```

```
┌─────────────────────────────────────────────────────────────────┐
│ DETERMINE, AT AN ELECTRONIC DEVICE, TO ACTIVATE A RELAY, WHEREIN │
│ THE ELECTRONIC DEVICE IS CONNECTED TO A RELAY AND A POWER SOURCE │
│                              702                                 │
└─────────────────────────────────────────────────────────────────┘
                                │
                                ▼
┌─────────────────────────────────────────────────────────────────┐
│ CAUSE A FIRST SWITCH CONNECTED IN SERIES WITH THE RELAY IN A FIRST│
│ CIRCUIT PATH OF THE ELECTRONIC DEVICE TO CLOSE, SUCH THAT A FIRST│
│ AMOUNT OF CURRENT FLOWS FROM THE POWER SOURCE THROUGH THE       │
│ RELAY, CAUSING THE RELAY TO ENTER AN ACTIVATED STATE            │
│                              704                                 │
└─────────────────────────────────────────────────────────────────┘
                                │
                                ▼
┌─────────────────────────────────────────────────────────────────┐
│ SUBSEQUENT TO THE RELAY ENTERING THE ACTIVATED STATE, CAUSE THE │
│                    FIRST SWITCH TO OPEN                          │
│                              706                                 │
└─────────────────────────────────────────────────────────────────┘
                                │
                                ▼
┌─────────────────────────────────────────────────────────────────┐
│ CAUSE A SECOND SWITCH CONNECTED IN SERIES WITH THE RELAY IN A   │
│ SECOND CIRCUIT PATH OF THE ELECTRONIC DEVICE TO CLOSE           │
│                              708                                 │
└─────────────────────────────────────────────────────────────────┘
```

POWER STEALING IN RELAY CIRCUITS

RELATED APPLICATIONS

This application claims priority to and is a continuation of U.S. patent application Ser. No. 16/714,056, filed on Dec. 13, 2019, the entire contents of which are incorporated herein by reference.

BACKGROUND

Various types of control systems, such as Alternating Current (AC) relays or contactors, are often used in circuits to selectively activate higher-voltage components of a power load. As an example, AC relays have traditionally been used to selectively "turn on" or activate power loads in households, such as doorbells or heating, ventilation, and air conditioning (HVAC) systems. For instance, an AC relay can be connected in a power-control circuit with a thermostat to control an HVAC system, and a power supply (typically a 24 VAC power-supply transformer). A traditional thermostat would include temperature sensors that would monitor the temperature of the household and cause a mechanical switch to open or close in the power-control circuit. When the mechanical switch in the thermostat closes due to a temperature being more than a threshold amount from a desired temperature, the power supply is placed in parallel with the AC relay and causes the AC relay to activate the HVAC system to heat or cool the household.

Thermostats have continued to become more complex and intelligent, and many include electrical/mechanical components as well as electronics for providing additional functionality to users (e.g., buttons, displays, processors to receive input from users to program temperatures, etc.). To support these electronics, thermostats require either an external power source, or their own independent power source, such as a battery. However, because thermostats are included in the power-control circuit, the thermostats only have one wire connected to the transformer, and the other wire is connected to the power load. While it is possible to have a direct wire from the system transformer to thermostats, it is very difficult to wire and costly for many households or other physical locations. Accordingly, thermostats generally include a battery to serve as a power supply for the components of the thermostats. However, there are various disadvantages in using a battery as a power supply, such as checking the battery and replacing it, and having the battery die, which results in the HVAC system no longer working.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for an electronic device to transition a control circuit including a relay from a first state in which the relay is inactive, and the electronic device is performing power-stealing into a second state where the relay is activated and the electronic device is unable to perform power-stealing. Further, the method includes the electronic device transitioning the control circuit into a third state where the relay is maintaining the active state while the electronic device is performing power-stealing techniques.

FIG. 7 illustrates a flow diagram of an example method for an electronic device to transition a relay from a first state during which the electronic device is unable to power steal from a control circuit while the relay is activated into a second state during which the electronic device is able to power steal while the activated state of the relay is maintained.

DETAILED DESCRIPTION

Figure 1:
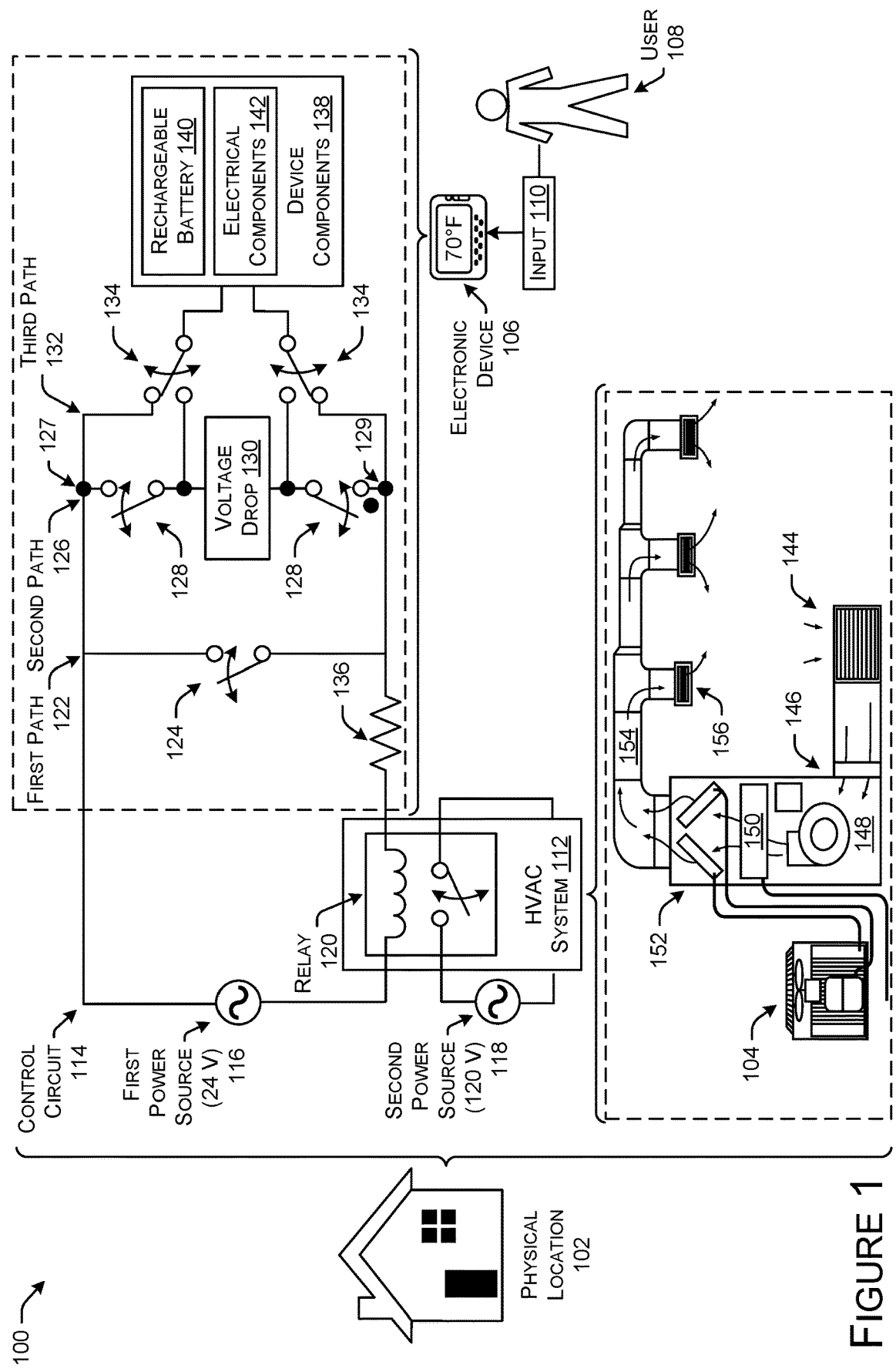
FIG. 1 illustrates a system-architecture diagram of an example environment in which an electronic device performs power-stealing techniques in a control circuit that includes a relay. The electronic device may be configured to harvest energy from the control circuit while the relay maintains an activated state.

This disclosure describes techniques for an electronic device, such as a thermostat, to perform power-stealing techniques to harvest energy from a power-control circuit to power components of the electronic device. In some examples, the electronic device may be connected in the power-control circuit between a power supply (e.g., 24 VAC) and a relay that is selectively configured to activate a power load, such as an HVAC system at a physical location. According to the techniques described herein, the electronic device may include voltage-drop circuitry that is connected in the power-control circuit such that a voltage drop is produced across electrical components of the electronic device while the relay is in an activated, or triggered, state. In this way, the electronic device may perform power-stealing from the power-control circuit while the relay is maintained in the activated state. The power that is harvested from the power-control circuit by the electronic device may be used to power components of the electronic device, such as recharging a battery, while the relay is activated for powering a power load, such as an HVAC system. Although the techniques are described herein as being performed by a thermostat, the techniques are equally applicable to any type of electronic device that may be configured to perform power-stealing techniques in a power-control circuit, including a relay-based power-control circuit. For instance, the electronic device may comprise a thermostat, doorbell, smoke detector, fire alarm, carbon monoxide detector, and so forth.

In a power-control circuit, an electronic device may be located between a first power supply (e.g., 24 VAC) and a relay, and include a switch that is selectively moveable to open the power-control circuit to prevent power from being delivered to the relay (e.g., inactivated state), and close the power-control circuit and power the relay such that the relay enters into an activated state. In some examples, it may be advantageous for the electronic device to perform power-stealing from the power-control circuit when the relay is in the inactivated state. Thus, the electronic device may include nodes that bypass the switch such that the power-control circuit is closed even when the switch is open. To avoid activation of the relay while the electronic device is power-stealing in the inactivated state, the electronic device may draw a small enough amount of current such that the current may flow through the relay underneath the energizing threshold of the relay. For instance, the electronic device may include a current limiting component to harvest small enough amounts of power from the power-control circuit to avoid inappropriately activating the relay, while still being able to power components of the electronic device and/or recharge a battery. However, when the electronic device closes the switch to transition the relay into the activated state, the available power from the power supply may be expended in the relay coil of the relay such that no power, or too little power, is available to harvest by the electronic device. Accordingly, batteries included in battery-powered electronic devices to run down and die in scenarios where the relay is in the activated state for extended periods of time, such as when an HVAC system is continually running to cool or heat a house or other location.

In order to perform power-stealing while the relay is in the activated state, the electronic device described herein may include voltage-drop circuitry that is connected to the power source and the relay such that a voltage drop is produced across electrical components of the electronic device while the relay is in the activated, or triggered, state. For instance, the electronic device may include a first circuit path, a second circuit path, and a third circuit path that are in parallel with each other and are each connected to the power supply. The first circuit path may include a first switch, the second circuit path may include one or more second switches in series with the voltage-drop circuitry, and the third circuit path may include one or more third switches that are in series with device components of the electrical device (e.g., rechargeable battery, processor, input/output mechanisms, etc.). However, in some examples the third circuit path may not include any switches.

The electronic device may be configured to enter into a first state (e.g., inactivated state) where the first switch and one or more second switches are open, and the one or more third switches (if included) are configured to connect the device components in series with power supply and the relay. In the first state, the amount of current drawn by the device components of the electronic device may be limited, using a current limiting component, to be underneath the energizing threshold of the relay. In this way, the electronic device is able to perform power-stealing techniques to harvest power from the power-control circuit without activating the relay.

While in the first state, the electronic device may determine to transition into a second state in which the relay is activated (e.g., activated state, triggered state, etc.). For instance, the electronic device may comprise a thermostat that receives user input indicating that the HVAC system is to be activated. As a specific example, a user may provide input at a button, touch screen, or other input mechanism indicating that the HVAC system is to cool or heat a household. As another example, the thermostat may be voice-enabled such that a user may issue an utterance including a command to activate the HVAC system and the thermostat is able to respond appropriately (e.g., performing speech processing and/or coordinating with a remote, cloud-based speech processing system, etc.).

The electronic device may transition from the first state into the second state by causing the first switch in the first circuit path to close, and causing the second switch(es) and third switch(es) (if included) to open the second circuit path and the third circuit path. In this way, the power supply may be placed in parallel with the relay, or otherwise be electrically connected to the relay, to provide all (or nearly all) of the available power to the relay to energize the relay. For instance, the voltage placed across the relay, and the amount of current flowing through the relay, may be such that an amount of power delivered to the relay surpass the energizing threshold to cause the relay to close (e.g., pull legs of a contractor of the relay) to make close a power load circuit in which the HVAC system (or other power load) is connected. Stated otherwise, the relay may enter the activated state in order to close a power load circuit such that the HVAC equipment turns on (or other power load).

Subsequent to activating the relay, the electronic device may transition into a third state in which the electronic device is able to perform power stealing, and the activated state of the relay is maintained. To transition into the third state, the electronic device may cause the second switch(es) to close such that the second circuit path is closed and the third circuit path that includes the components of the electronic device is in parallel with the second circuit path. Further, the electronic device may cause the first switch to open such that the current flows through the second and third circuit paths before eventually flowing through the relay. In this way, a voltage may be placed across the voltage-drop circuitry, as well as the components of the electronic device, such that current is "stolen" or harvested from the power-control circuit by the electronic device while the relay is in the activated state.

In some examples, the amount of power use to maintain the activated state of the relay is less than the amount of power used to initially energize or activate the relay. Accordingly, in the third state, the amount of power consumed by the electronic device may be small enough such that the relay is able to maintain the activated state to close the power circuit for the power load (e.g., HVAC system). In this way, the electronic device may be able to power components, and/or recharge a rechargeable battery used as an internal power supply for the electronic device.

In some examples, the electronic device may monitor an amount of current being provided to the relay, such as by using a current-sense resistor. The electronic device may include logic to determine, based on the amount of current being provide to the relay, that the electronic device may consume additional power, or should consume less power, to maintain the activated state of the relay. For instance, if the amount of current is falling and in danger of falling below a threshold amount of current for maintaining the activated state of the relay, the electronic device may use the current limiting component to reduce the amount of current being consumed by the electronic device. Similarly, if the amount of current provided to the relay is more than sufficient to maintain the activated state, the electronic device may cause the current limiting component to allow additional current to be consumed by the components of the electronic device. In this way, the electronic device may be configured to intelligently vary the amount of power that is harvested from the power-control circuit.

Although the techniques described herein are described primarily with respect to thermostats used to control HVAC systems, the techniques are generally applicable for any electronic device usable to perform power stealing. The techniques may be used by any electronic device that is configurable to harvest energy form a circuit that includes another component that requires at least a threshold amount of power. For instance, the techniques may be applied by a doorbell device that activates a relay to control a doorbell chime, a smoke detector that activates a relay to control an alarm or speaker, and so forth. As discussed more below; various components may be used as described herein. For instance, the switches described herein may comprise any type of switch, such as triacs, thyristors, mechanical relays, discrete transistors, and any other type of component selectively configurable to open and close connections. Although the techniques are described with reference to Alternating Current (AC) voltages, currents, and/or power, the techniques may be applicable to Direct Current (DC) depending on the circuitry.

The techniques described herein enable an additional state in a power-control circuit where an electronic device can harvest energy from the circuit while maintaining an activated state of a relay in the circuit. Accordingly, the electronic device may receive energy to power components of the electronic device and/or charge a rechargeable battery of the electronic device. In this way, the electronic device may receive power from the power-control circuit while maintaining an activated state of a relay, which may be useful for extended periods of time that the relay is activated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an electronic device performs power-stealing techniques in a control circuit that includes a relay. The electronic device may be configured to harvest energy from the control circuit (referred to as power stealing) while the relay maintains an activated state.

In some examples, the environment 100 may include a physical location 102 that includes an HVAC system that cools and/or heats the physical location 102. Although illustrated as a house, the physical location 102 may comprise any type of building (e.g., warehouse, commercial building, store, restaurant, etc.), semi-covered area, and/or outside area which may be associated with a heating and/or cooling system. The physical location 102 may include an electronic device 106, such as a thermostat, that is configured to perform improved power-stealing techniques. As noted above, the techniques described herein are with reference to a thermostat for controlling an HVAC system, but the techniques are applicable in many different scenarios.

In some examples, a user 108 may interact with the electronic device 106 using various types of input 110 to designate desired temperatures for the thermostat, cause the electronic device 106 to perform actions (e.g., activate HVAC systems 112), and so forth. The input 110 may comprise various types of input 110, such as input 110 via a mechanical mechanism (e.g., press of button(s), touch of touch screen, rolling of a dial, etc.). In some examples, the electronic device 106 may be voice-enabled such that it is capable of receiving and responding to commands in utterances of the user 108 (alone and/or in conjunction with a remote speech-processing system). Further, the input 110 may comprise signals received from another device, such as a phone of the user 108, a computer of the user 108, etc., that indicates a requested operation for the electronic device 106 to perform with respect to an HVAC system 112.

The electronic device 106 may be included in a control circuit 114 that includes a first power source 116 (e.g., 24 VAC power supply, and/or any other VAC), and a relay 120. As described herein, a power source may a source of electric power that is available for use by the physical location 102. For instance, a power source may comprise a mains power source provided by a utility or other service provider. In some instances, the power source may comprise a generator that provides a near-constant power supply for use the by physical location 102. The power sources described herein may provide power at pre-configured nominal voltages depending on, for example, the size and/or types of transformers used to step up and/or step-down voltages from a mains power source, such as a power grid or electrical grid.

Further, as described herein the relay 120 may comprise any type of relay 120 that is selectively activated by allowing a threshold amount current to flow through the relay 120. For instance, the relay 120 may comprise an AC relay 120 that is an electromagnetic device including a spring-loaded lever to switch electrical contacts to energize the relay 120, and AC current (or DC current for a DC relay 120) is passed through the coil of the electromagnet, thereby magnetizing the core to attract the lever. In this way, a current that is applied to the coil may switch a large electrical current in the contacts, and the current may serve as a switch to activate the relay 120. In a DC relay 120 example, the DC relay 120 may include a single coil of wire wound around an iron core to make an electromagnetic. When the DC coil is energized, the magnetism keeps the lever attracted as long as the DC current is flowing. Upon lowering the DC current below a threshold, thereby demagnetizing the iron core, the spring-loaded lever returns to a relaxed position and the electrical contacts are switched back.

The relay 120 may be activated such that a power circuit is closed to allow a second power source 118 (e.g., 120 VAC) to provide power to the HVAC system 112. The relay may comprise any type of switch or relay that is activated when more than a threshold amount of AC current (and/or AC power) flows through the relay 120 to cause the relay 120 to activate. Generally, the relay 120 may comprise an electromagnet with an internal spring-loaded lever to switch electrical contacts to open and close the relay 120. When an amount of AC current flows through the relay coils of the relay 120 that is greater than an energizing threshold for the relay 120, the relay 120 is activated such that the coil of the electromagnet is magnetized to attract the lever. The relay 120 then maintains the activated state, allowing the HVAC system 112 to receive power in the completed circuit from the second power source 118, until the amount of AC current flowing through the relay 120 drops below a maintain-activated state threshold amount (which may be the same as, or less than, the energizing threshold).

The electronic device 106 may include multiple paths through which AC current may flow from the first power source 116 depending on whether switches are opened or closed. For example, the electronic device 106 may include a first circuit path 122 in which a first switch 124 is connected, a second circuit path 126 in which one or more second switches 128 and voltage drop circuitry 130 are connected, and a third circuit path 132 in which one or more third switches 134 and device components 138 are connected. However, as described in FIGS. 2A-2C, the third circuit path 132 may not include the one or more switches 134.

Generally, as described herein, a switch may comprise any device that is selectively configurable to interrupt the current flow in a circuit path, or allow current to flow through a circuit path. The switches may comprise mechanical switches such as one or more of a single pole single throw switch (SPST), single pole double throw switch (SPDT), double pole single throw switch (DPST), double pole double throw switch (DPDT), etc. The switches may comprise electronic switches, such as one or more of a transistor, thyristor, bipolar transistor, power diode, metal oxide semiconductor field effect transistors (MOSFET), insulated gate bipolar transistor (IGBT), silicon controlled rectifier (SCR), Triac (TRIode AC), DIAC (Diode AC Switch), GTO (Gate Turn off Thyristor), and/or any other type of electrical switch.

Figure 2A:
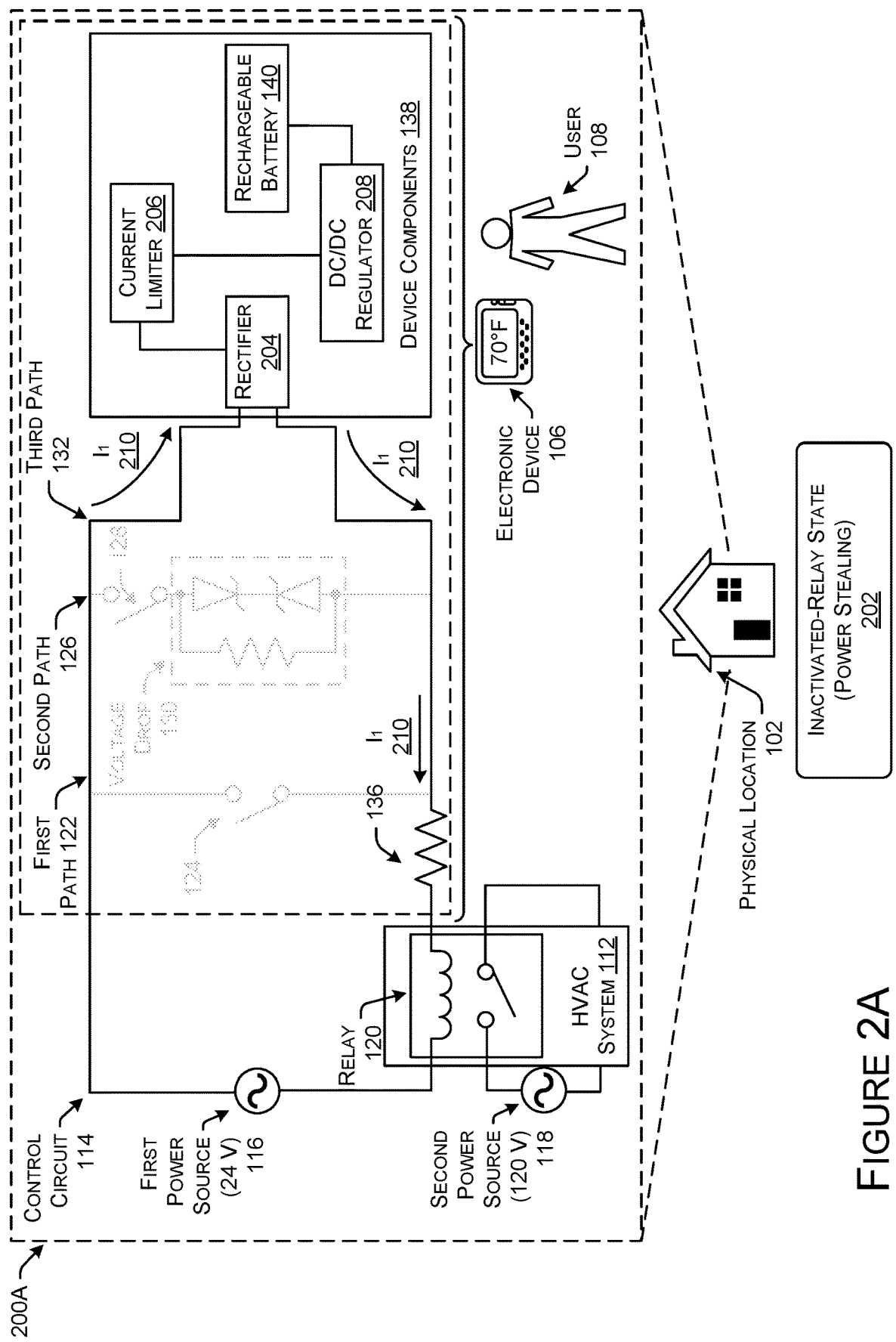
FIG. 2A illustrates a system-architecture diagram of an example environment in which an electronic device performs power-stealing techniques in a control circuit that includes a relay that is in an inactivated state.
Figure 2B:
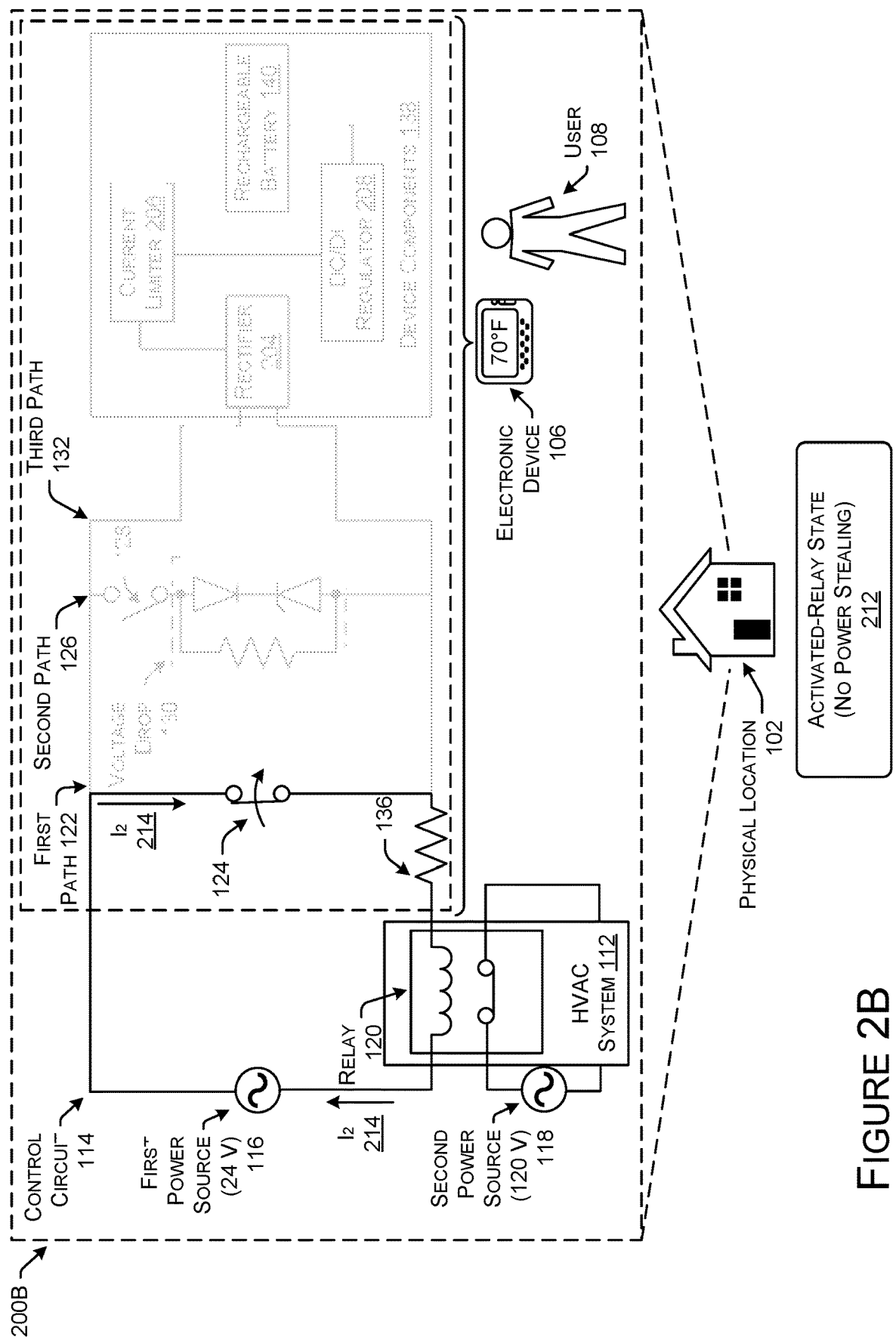
FIG. 2B illustrates a system-architecture diagram of an example environment in which an electronic device in a control circuit transitions a relay from an inactivated state to an activated state.
Figure 2C:
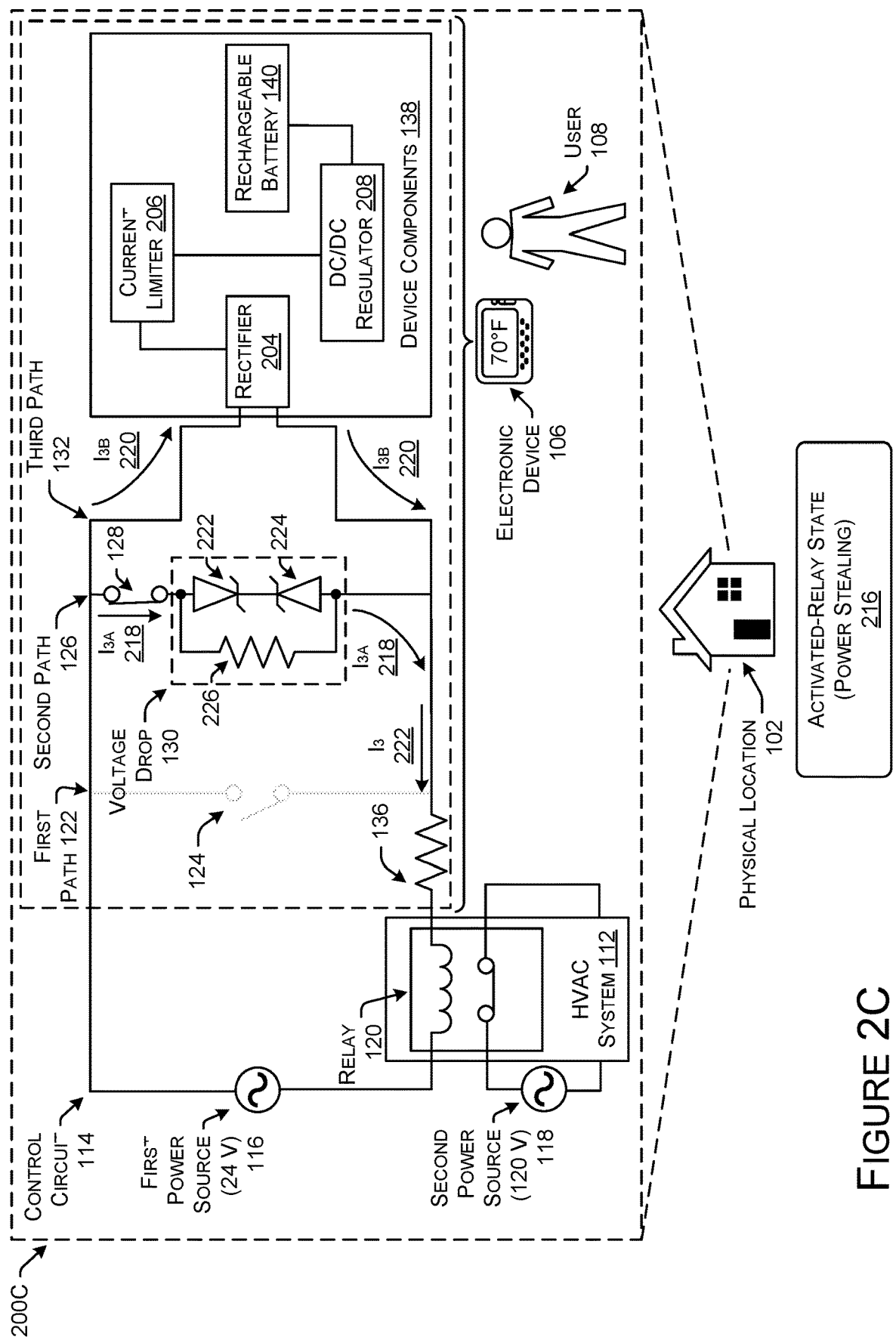
FIG. 2C illustrates a system-architecture diagram of an example environment in which an electronic device performs power-stealing techniques in a control circuit that includes a relay that is maintaining an activated state.

Among other components, the device components 138 may include at least one rechargeable battery 140 and various electrical components 142 discussed further with reference to FIGS. 2A-2C. Generally, a rechargeable battery may comprise a power source that discharges while providing power to electrical components, and recharges by receiving power at a rated voltage and/or current. The rechargeable battery, as described herein, may comprise one or more of a lead-acid battery, nickel-cadmium battery, nickel-metal hydride battery, lithium-ion battery, lithium-ion polymer batter, rechargeable alkaline battery, and/or any other type of battery that is configured to be recharged one or more times.

As illustrated, the first circuit path 122, second circuit path 126, and third circuit path 132 may be connected in parallel such that each of the paths are connected to a top node 127 to which the first power source 116 is connected, and also connected to a bottom node 129 to which the relay 120 (potentially with a current-sense resistor 136 connected between) is connected. As described herein, a node may comprise any point in a circuit where the terminals or two or more circuit elements meet. A node may, in some examples, comprise an entire length of wire extending between terminals or one or more circuit elements.

The electronic device 106 may include logic configured to open and close the switches 124, 128, and 134 in different combinations such that the electronic device 106 may activate and inactivate the relay 120, and perform power-stealing techniques at various stages to power the device components 138 and/or charge the rechargeable battery 140. The different stages through which the electronic device configures the control circuit 114 are discussed further with reference to FIGS. 2A-2C. As described herein, the logic of the electronic device 106 may be implemented by one or more of software, firmware, and/or hardware components. For instance, the logic may comprise one or more of an Integrated Circuit (IC), processor Application-Specific Integrated Circuit (ASIC), Field-Programmable Gate Array (FPGA), any type of software and/or firmware executing thereon, and/or any combination thereof or other types of logic. The logic may be implemented using hardware components, such as diodes, transistors, multiplexers, registers, resistors, capacitors, inductors, comparators, and/or any type of IC known in the art.

As illustrated, the control circuit 114 and/or the electronic device 106 may further include the current-sense resistor 136 usable by the electronic device 106 to monitor an amount of AC current being provided to the relay 120. The electronic device 106 may include logic to determine, based on the amount of AC current being provided to the relay 120, that the electronic device 106 may consume additional power, or should consume less power, to maintain the activated state of the relay 120. For instance, if the amount of AC current is falling and in danger of falling below a threshold amount of AC current for maintaining the activated state of the relay 120, the electronic device 106 may use the current limiting component 142 to reduce the amount of AC current being consumed by the electronic device 106. Similarly, if the amount of AC current provided to the relay 120 is more than sufficient to maintain the activated state, the electronic device 106 may cause the current limiting component 142 to allow additional AC current to be consumed by the components of the electronic device 106. In this way, the electronic device 106 may be configured to intelligently vary the amount of power that is harvested from the control circuit 114. Further description of the current-sense resistor 136 is described with reference to FIGS. 2A-2C and FIG. 3.

The HVAC system 112 may include various components, devices, machines, etc., depending on the type of HVAC system 112. Any components described herein may be removed, and any type of component may be included, other than those illustrated in the HVAC system 112. The HVAC system 112 may be controlled by the electronic device 106 to provide heating, cooling, ventilation, and/or other air-handling for the physical location 104. The compressor 104 may serve as a source of heat using electricity and/or a gas line. For instance, the compressor 240 may draw in air from the return air ducts 144, such as air within the physical location 104, and pass through filter 146 to filter the air. The air may be pulled through the return air duct 144 and filter 146 by a fan 148 and subsequently be heated through heating coils or elements 150. The heated air may then flow back into the physical location 104 through a supply air duct 154 and out the supply air grills 156. In other examples, air is drawn in through the return air duct 144 and filter 146 by the fan 148 and passes through a coolant or gas, such as Freon, through a set of cooling coils 152 where the air is cooled. The cool air is then returned through the supply air duct 154 and out through the supply air grills 156. The HVAC system 112 is configured to be selectively activated by operation of the electronic device 106, which may be connected to control electronics of the HVAC system 112 via one or more wires (e.g., to indicate cooling of air required, heated air required, humidifier, etc.).

The switches 124, 128, and/or 134 may be any type of switch configured to be selectively operable to open and close. For instance, switches 124, 128, and/or 134 may comprise solid state relays, triacs, thyristors, mechanical relays, discrete transistors, a pulse-width modulation system, or any other type of component selectively configurable to open and close connections.

FIGS. 2A-2C illustrate three different configurations of the control circuit 114 that correspond to three different states of the relay 120. FIG. 2A illustrates a first control circuit 114 configuration in which the relay 120 is in an inactivated state. FIG. 2B illustrates a second control circuit 114 configuration in which the relay 120 transitions from the inactivated state to an activated state. FIG. 2C illustrates a third control circuit 114 configuration in which the relay 120 maintains the activated state.

FIG. 2A illustrates a system-architecture diagram of an example environment 200A in which the electronic device 106 performs power-stealing techniques in the control circuit 114 when the relay 120 that is in an inactivated state 202. In FIGS. 2A, the third circuit path 132 may not include the one or more third switches 134 described in FIG. 1. Rather, the third circuit path 132 may include the device components 138 may be connected in parallel with the second circuit path 126. Further, the first circuit path 122 and second circuit path 126 in FIGS. 2A-2C may include a single switch, namely, first switch 124 and second switch 128, respectively. In some examples, the second switch 128 may be connected below the voltage drop 130 in the second flow path 126.

For clarity, the first circuit path 122 and the second circuit path 126 are grayed-out in FIG. 2A, because in this first configuration no current flows through either of the first circuit path 122 or the second circuit path 126.

As illustrated, the control circuit 114 may be in the first state (the inactivated relay state 202) where the electronic device 106 is performing power stealing to power the device components 138. To put the control circuit 114 in the inactivated relay state 202, the electronic device 106 may cause the first switch 124 to open to prevent AC current from flowing through the first circuit path 122. Similarly, the electronic device 106 may cause the second switch 126 to open to prevent AC current from flowing through the second circuit path 126. In this way, the third circuit path 132 may receive the same amount of current ($I_1$) 210 that may flow through the electronic device 106 and the relay 120. Depending on the components in the control circuit 114, the value for the amount of current ($I_1$) 210 may be fairly low, such as 50 milli-amps (mA), or less.

In the illustrated example, the amount of current ($I_1$) 210 may be less than an energizing threshold for activating the relay 120. In this way, the current ($I_1$) 210 may flow through the relay 120 without activating the relay 120, but the electronic device 106 may still receive the current ($I_1$) 210 to perform power stealing. The current ($I_1$) 210 may flow through the device components 138 of the electronic device 106. In embodiments where the current ($I_1$) 210 is AC current, such components 138 may include a rectifier 204 to convert the AC current ($I_1$) 210 into direct current (DC) by allowing the AC current ($I_1$) 210 to flow in one direction only (and/or using capacitor(s) to hold the voltage). The DC current may then flow through a current limiter 206 configured to vary, and limit, the amount of DC current drawn by the device components 138. The current limiter 206 may comprise any type of circuit component, integrated circuit, etc., configured to impose an upper limit on the amount of current that may be delivered to the electrical device 106.

For example, the current limiter 206 may comprise a current sensor (e.g., current sense resistor), a control circuit, and a pass transistor. The current limiter 206 may in some examples comprise a low-value resistor as the voltage across it is proportional to the current, and the low voltage can be used to control the current flow through the pass transistor. The current limiter 206 may be configured to limit the amount of current ($I_1$) 210 drawn by the components 138 of the electronic device 106 based on the relay 120 to maintain the inactivated-relay state 202. The electronic device 106 may further include a DC/DC regulator (or converter) 208 configured to convert an input DC voltage into a desired output DC voltage for powering the components 138 of the electronic device 106 and/or providing power to other components of the electronic device 106. The DC/DC regulator 208 may comprise a step-up converter (e.g., boost converter) to step up the input voltage to a higher voltage, a step-down converter (e.g., buck converter) to step down an input voltage to a lower voltage, and/or a step-up/step-down converter.

The AC current ($I_1$) 210 may pass through the current-sense resistor 136 and relay 120 back to ground. As described in more detail with reference to FIGS. 2C and 3, the current-sense resistor 136 may be used to monitor the amount of AC current ($I_1$) 210 flowing through the relay 120, which is then used as feedback for the current limiter 206 to increase or decrease the amount of AC current ($I_1$) 210. Accordingly, FIG. 2A illustrates an example in which the control circuit 114 is in an inactivated-relay state 202, and the electronic device 106 is performing power-stealing techniques.

FIG. 2B illustrates a system-architecture diagram of an example environment 200B in which the electronic device 106 in the control circuit 114 transitions the relay 120 from the inactivated state 202 to an activated state 212. In FIG. 2B, the first switch 124 may be closed and the second switch 128 may be open. For clarity, the second circuit path 126 and the third circuit path 132 are grayed-out in FIG. 2B, because in this second configuration no current flows through either of the second circuit path 126 or the third circuit path 132.

While in the inactivated-relay state 202 (FIG. 2A), the electronic device may determine to transition into the second state (the activated-relay state 212) in which the relay 120 is activated (e.g., activated state, triggered state, etc.). For instance, the electronic device 106 may receive user input 110 indicating that the HVAC system 112 is to be activated. As a specific example, a user 108 may provide input at a button, touch screen, or other input mechanism of the electronic device 106 indicating that the HVAC system 112 is to cool or heat the physical location 102. As another example, the electronic device 106 may be voice-enabled such that the user 108 may issue an utterance including a command to activate the HVAC system 112, and the electronic device 106 is able to respond appropriately (e.g., performing speech processing and/or coordinating with a remote, cloud-based speech processing system, etc.).

The electronic device 106 may transition from the inactivated-relay state 202 into the activated-relay state 212 by causing the first switch 124 in the first circuit path 122 to close, and leaving the second switch 128 open to open circuit the second circuit path 126. In this way, the first switch 124 creates a dead short in the control circuit 114 so that all (or nearly all) of the available power from the first power source 116 is provided to the relay 120 to energize the relay 120. For instance, the voltage placed across the relay 120, and the amount of AC current ($I_2$) 214 flowing through the relay 120, may be such that an amount of power delivered to the relay 120 surpasses the energizing threshold to cause the relay 120 to close (e.g., pull legs of a contactor of the relay), thereby closing a circuit in which the HVAC system 112 (or other power load) is connected, thereby allowing the second power source 118 to power the HVAC system 112. Stated otherwise, the relay 120 may enter the activated-relay state 212 in order to close a circuit such that the HVAC equipment 112 turns on. Depending on the components in the control circuit 114, the value for the amount of current ($I_2$) 214 may be in the hundreds of mill-amps, such as 100-500 mA (although values may vary based on the components and circuitry involved).

FIG. 2C illustrates a system-architecture diagram of an example environment 200C in which the electronic device 106 performs power-stealing techniques in the control circuit 114 when the relay 120 is in the third state (an activated-relay-maintenance state 216). In FIG. 2C, the first switch 124 is open to prevent current from flowing through the first circuit path 122, and the second switch 128 is closed to allow current to flow through the second circuit path 126. For clarity, the first circuit path 122 is grayed-out in FIG. 2C, because in this third configuration no current flows through the first circuit path 122.

In some instances, subsequent to causing the relay 120 to enter the activated-relay state 212, the electronic device 106 may cause the relay 120 to enter the activated-relay-maintenance state 216, in which the control circuit 114 is configured to perform power stealing. To transition into the activated-relay-maintenance state 216, the electronic device 106 may cause the first switch 124 to open, and cause the second switch(es) 128 to close, while the third switch(es) 132 remain in their second positions, such that the second circuit path 126 is closed and the third circuit path 132, which includes the components of the electronic device 106, is connected in parallel with the second circuit path 126. In this way, an AC voltage may be placed across the voltage drop 130, as well as the components 138 of the electronic device 106, such that AC current is "stolen" or harvested from the control circuit 114 by the electronic device 106 while the relay 120 is in the activated-relay-maintenance state 216.

The voltage drop 130 may be implemented using various components configured to generate a voltage drop across nodes. For instance, the voltage drop may include two Zener diodes 222 and 224 in series with opposite orientations. A diode comprises a two-terminal electronic component that conducts current primarily in one direction, having low resistance in one direction and high (e.g., infinite) resistance in the other direction. A voltage drop across a diode may comprise around 0.6V or 0.7V. Conversely, a Zener diode is a semiconductor device that allows current to flow in either a forward or reverse direction. The Zener diode consists of a heavily doped p-n junction, designed to conduct in the reverse direction when a certain specified voltage is reached. That is, the Zener diodes generally have forward conduction and reverse conduction voltage. For instance, when a Zener diode is reverse biased, it will have a clamping voltage of the Zener rating (e.g., 3 volts, 5 volts, etc.). When the Zener diode is forward biased, there may be a standard 0.7 volt drop. Accordingly, when two Zener diodes are placed in opposite directions and in series, a voltage drop across the Zener diodes will include a drop from one diode in reverse bias and another voltage drop across the other Zener diode of the standard drop. In some examples, an AC wave that is placed across the Zener diodes may output a clamped, square-wave output voltage.

As illustrated, the two Zener diodes may be placed in parallel with a resistor 226 to help prevent cross-over distortion (e.g., a type of distortion caused by switching between devices driving a load that produces a zero voltage "flat spot" or "deadband" on the output waveform). For instance, the output waveform from the Zener diodes may include some dead time, or a time period where the voltage is at zero volts, or near zero volts. This may result in zero current conduction, which may be problematic for the relay 120 as there would be no voltage across the relay 120, which may cause chatter (e.g., contact chatter due to a shock or vibration to the relay 120 or an improper signal to the relay 120). Accordingly, the resistor 226 in parallel with the two Zener diodes 123 and 125 may smooth out the cross-over distortion by smoothing the output wave from having a zero voltage or flat spot to be a smoother sinusoidal waveform. Depending on the circuit, the resistor 226 may be on the order of, or about, 100 ohms (although the values may vary for different circuits).

However, the voltage drop 130 may comprise different components than those illustrated in FIG. 2C. For instance, the voltage drop 130 may comprise a triac, AC switching components, or even a full pulse-width modulation (PWM) component where more or less power is drawn during certain parts of the sine wave. The PWM component may cause a voltage drop 130 by reducing the average power delivered through the voltage drop 130 by switching a switch according to a switching frequency to effectively chop it up into discrete parts. The average value of voltage (and current) fed to the relay 120 is controlled by turning the switch between supply and load on and off at a fast rate. The longer the switch is on compared to the off periods, the higher the total power supplied to the load. However, any other type of circuit or component may be used that is configurable to serve as the voltage drop 130. Depending on the circuit and components used therein, the voltage drop 130 may be on the order of, or about, 5 VAC (rms) (although the values may vary for different circuits).

By placing the voltage drop 130 in parallel with the device components 138 in the third circuit path 132, the device components 138 are provided with the same voltage as that placed across the voltage drop 130. In this way, the voltage drop 130 may cause an amount of current ($I_{3A}$) 218 to flow through the second circuit path 126, and the voltage placed across the device components 138 may cause an current ($I_{3B}$) 220 to flow through the third circuit path 132. The current ($I_{3A}$) 218 and the current ($I_{3B}$) 220 may then combine to be current ($I_3$) 222 that flows through the relay 120 to maintain the activated-relay-maintenance state 216 of the relay 120, while allowing the electronic device 106 to harvest energy from the first power source 116. Depending on the components in the control circuit 114, the value for the amount of current ($I_3$) 218 may be lower than current ($I_2$) 214, but greater than current ($I_1$) 210. For example, the split between the current ($I_{3A}$) 218 and the current ($I_{3B}$) 220 may vary depending on the current consumption of the rest of the system.

In some examples, the amount of power used to maintain the activated-relay-maintenance state 216 of the relay 120 is less than the amount of power used to initially energize or activate the relay 120. Accordingly, in the activated-relay-maintenance state 216, the amount of power consumed by the electronic device 106 may be small enough such that the relay 120 is able to maintain the activated-relay-maintenance state 216 to close the power circuit for the power load (e.g., HVAC system 112). In this way, the electronic device 106 may be able to power one or more of the device components 138, including recharging the rechargeable battery 140 used as an internal power supply for the electronic device 106.

In some examples, the electronic device 106 may monitor the amount of current ($I_3$) 222 being provided to the relay 120, such as by using the current-sense resistor 136. The electronic device 106 may include logic to determine, based on the amount of current ($I_3$) 222 being provided to the relay 120, that the electronic device 106 may consume additional power, or should consume less power, to maintain the activated-relay-maintenance state 216 of the relay 120. For instance, if the amount of current ($I_3$) 222 is falling and in danger of falling below a threshold amount of current for maintaining the activated state of the relay 120, the electronic device 106 may use the current limiter 206 to reduce the amount of current ($I_{3B}$) 220 being drawn by the electronic device 106. Similarly, if the amount of current ($I_3$) 222 provided to the relay 120 is more than sufficient to maintain the activated-relay-maintenance state 216, the electronic device 106 may cause the current limiter 206 to allow additional current ($I_{3B}$) 220 to be consumed by the components of the electronic device 106. In this way, the electronic device 106 may be configured to intelligently vary the amount of power that is harvested from the control circuit 114.

Figure 3A:
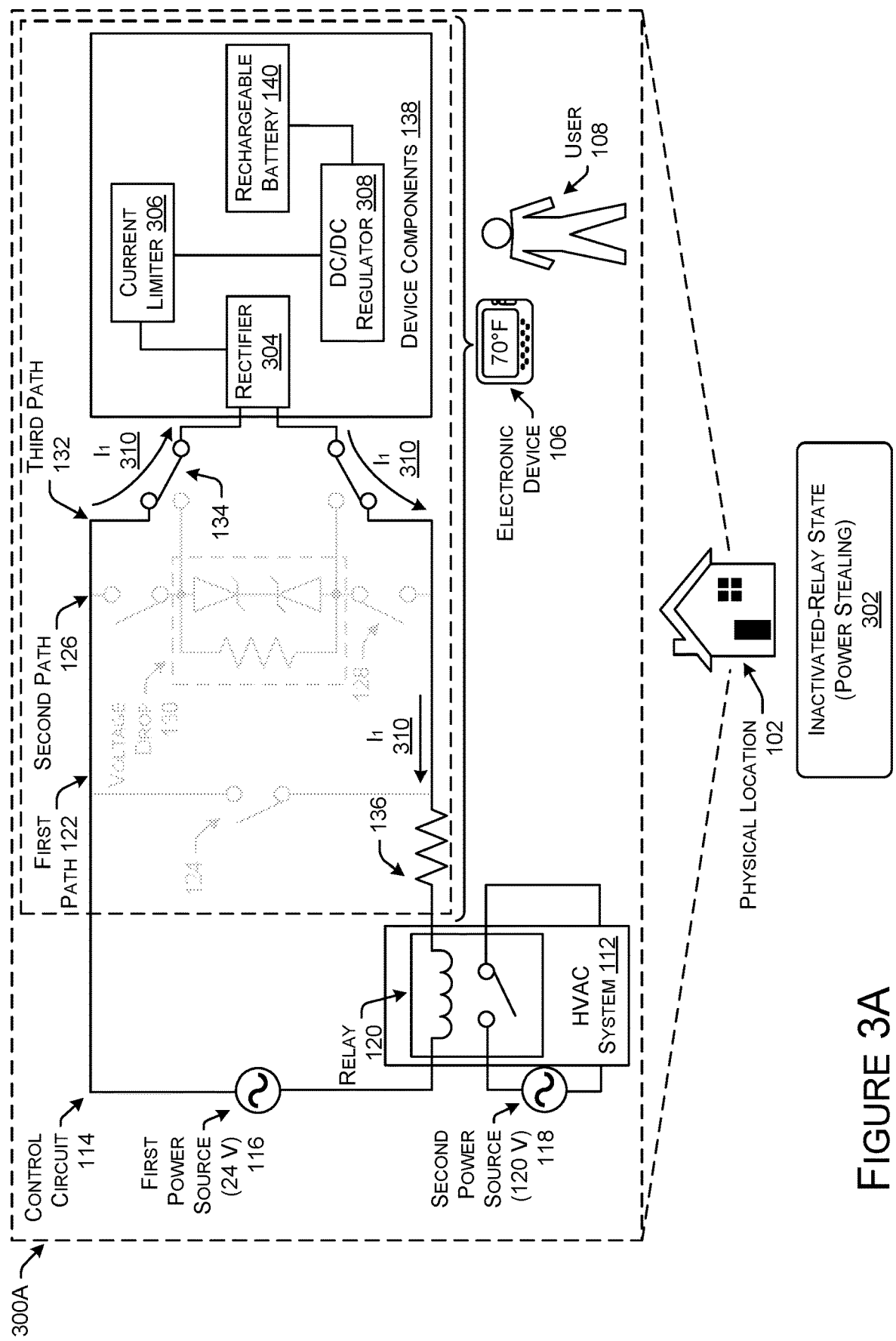
FIG. 3A illustrates a system-architecture diagram of an example environment in which an electronic device performs power-stealing techniques in a control circuit that includes a relay that is in an inactivated state. The electronic device may include first, second, and third circuit paths that each include one or more switches, respectively.
Figure 3B:
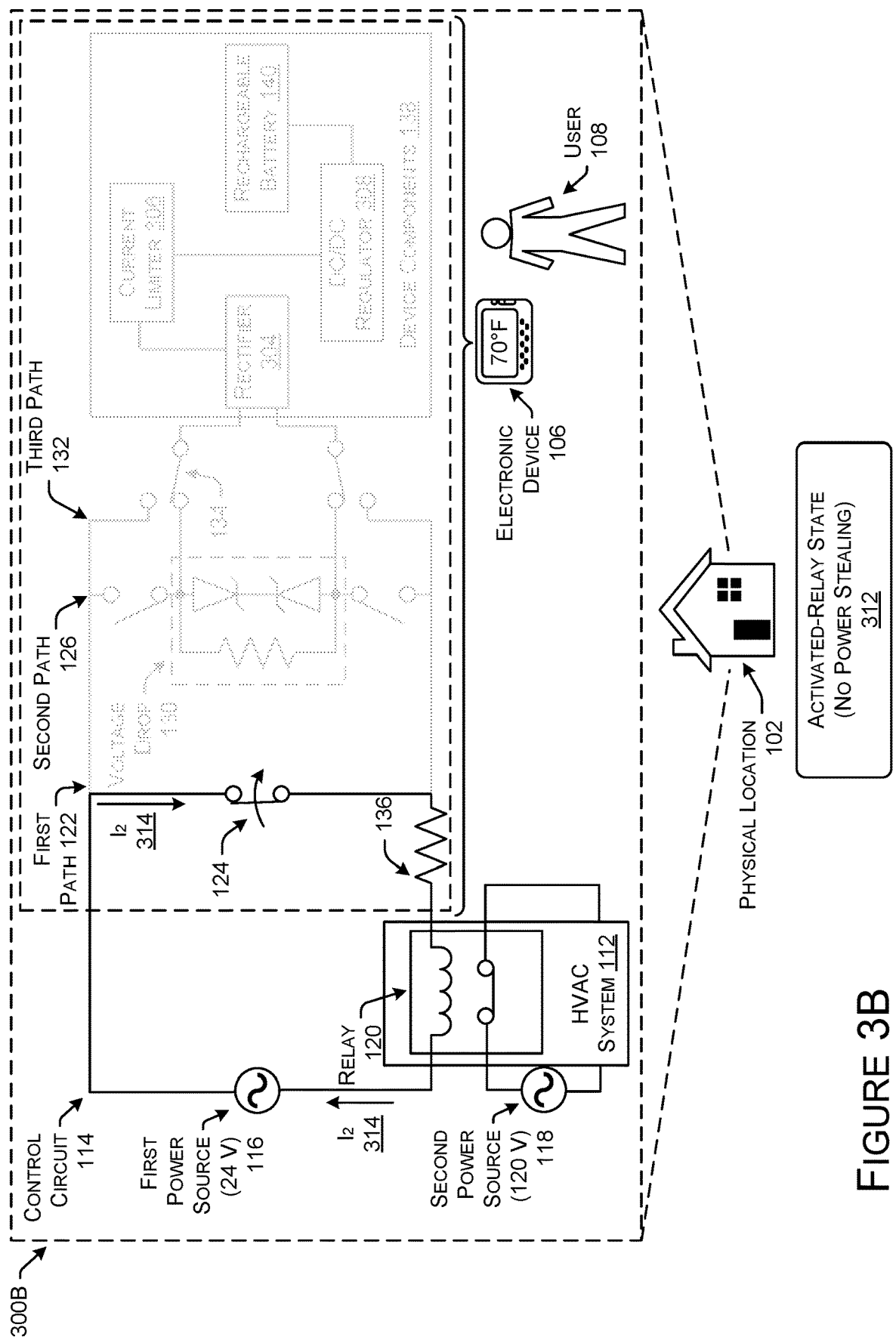
FIG. 3B illustrates a system-architecture diagram of an example environment in which an electronic device in a control circuit transitions a relay from an inactivated state to an activated state. The electronic device may include first, second, and third circuit paths that each include one or more switches, respectively.
Figure 3C:
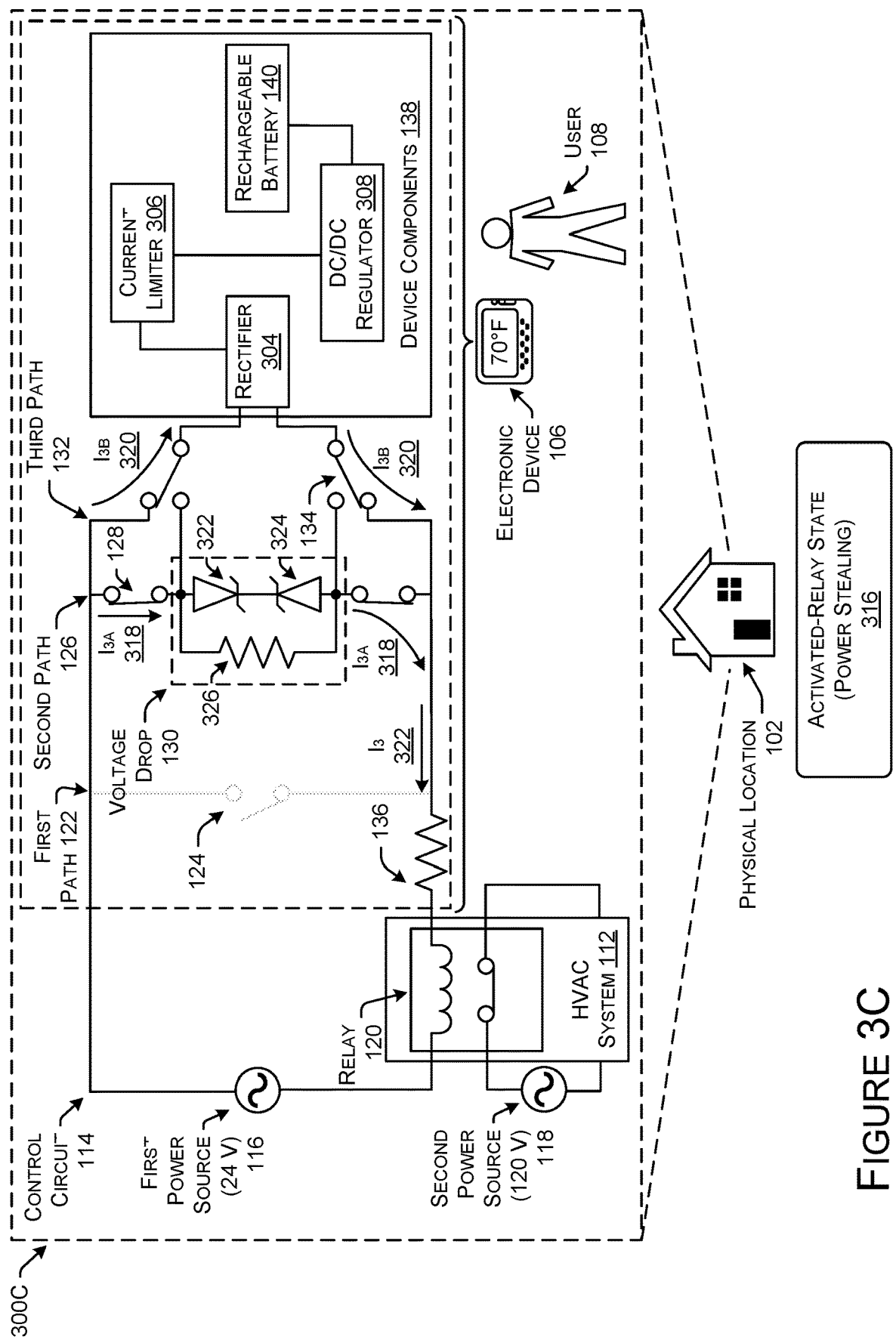
FIG. 3C illustrates a system-architecture diagram of an example environment in which an electronic device performs power-stealing techniques in a control circuit that includes a relay that is maintaining an activated state. The electronic device may include first, second, and third circuit paths that each include one or more switches, respectively.

FIGS. 3A-3C illustrate three different configurations of the control circuit 114 that correspond to three different states of the relay 120. FIG. 3A illustrates a first control circuit 114 configuration in which the relay 120 is in an inactivated state. FIG. 3B illustrates a second control circuit 114 configuration in which the relay 120 transitions from the inactivated state to an activated state. FIG. 3C illustrates a third control circuit 114 configuration in which the relay 120 maintains the activated state. Importantly, FIGS. 3A-3C illustrate examples where the second circuit path 126 includes multiple second switches 128 and the third circuit path 132 includes multiple third switches 134. Insofar as components of FIGS. 3A-3C are similar or the same as those depicted in FIGS. 1 and 2A-2C, the descriptions of the corresponding components are equally applicable to the components shown in FIGS. 3A-3C.

FIG. 3A illustrates a system-architecture diagram of an example environment 300A in which the electronic device 106 performs power-stealing techniques in the control circuit 114 when the relay 120 that is in an inactivated state 302. For clarity, the first circuit path 122 and the second circuit path 126 are grayed-out in FIG. 3A, because in this first configuration no current flows through either of the first circuit path 122 or the second circuit path 126.

As illustrated, the control circuit 114 may be in the first state (the inactivated relay state 302) where the electronic device 106 is performing power stealing to power the device components 138. To put the control circuit 114 in the inactivated relay state 302, the electronic device 106 may cause the first switch 124 to open to prevent current from flowing through the first circuit path 122. Similarly, the electronic device 106 may cause the second switch(es) 126 to open to prevent current from flowing through the second circuit path 126. The electronic device 106 may cause the third switch(es) 132 to close such that the third circuit path 132 is connected to the first power source 116, and completing the control circuit 114. In this way, the same amount of current ($I_1$) 310 may flow through the electronic device 106 and the relay 120.

In the illustrated example, the amount of current ($I_1$) 310 may be less than an energizing threshold for activating the relay 120. In this way, the current ($I_1$) 310 may flow through the relay 120 without activating the relay 120, but the electronic device 106 may still receive the current ($I_1$) 310 to perform power stealing. The current ($I_1$) 310 may flow through the device components 138 of the electronic device 106. In embodiments where the current ($I_1$) 310 is AC current, such components 138 may include a rectifier 304 to convert the current ($I_1$) 310 into direct current (DC) by allowing the AC current ($I_1$) 310 to flow in one direction only (and/or using capacitor(s) to hold the voltage). The DC current may then flow through a current limiter 306 configured to vary, and limit, the amount of DC current drawn by the device components 138. The current limiter 306 may comprise any type of circuit component, integrated circuit, etc., configured to impose an upper limit on the amount of current that may be delivered to the electrical device 106. The current limiter 306 may be selectively configurable to increase and/or decrease the amount of current drawn by the components 138 of the electronic device 106. The electronic device 106 may further include a DC/DC regulator (or converter) 308 configured to convert an input DC voltage into a desired output DC voltage for powering the components 138 of the electronic device 106 and/or providing power to other components of the electronic device 106.

The current ($I_1$) 310 may pass through the current-sense resistor 136 and relay 120 back to ground. As described in more detail with reference to FIGS. 3C and 3, the current-sense resistor 136 may be used to monitor the amount of AC current ($I_1$) 310 flowing through the relay 120, which is then used as feedback for the current limiter 306 to increase or decrease the amount of current ($I_1$) 310. Accordingly, FIG. 3A illustrates an example in which the control circuit 114 is in an inactivated-relay state 302, and the electronic device 106 is performing power-stealing techniques.

FIG. 3B illustrates a system-architecture diagram of an example environment 300B in which the electronic device 106 in the control circuit 114 transitions the relay 120 from the inactivated state 302 to an activated state 312. For clarity, the second circuit path 126 and the third circuit path 132 are grayed-out in FIG. 3B, because in this second configuration no current flows through either of the second circuit path 126 or the third circuit path 132.

While in the inactivated-relay state 302 (FIG. 3A), the electronic device may determine to transition into the second state (the activated-relay state 312) in which the relay 120 is activated (e.g., activated state, triggered state, etc.). For instance, the electronic device 106 may receive user input 110 indicating that the HVAC system 112 is to be activated. As a specific example, a user 108 may provide input at a button, touch screen, or other input mechanism of the electronic device 106 indicating that the HVAC system 112 is to cool or heat the physical location 102. As another example, the electronic device 106 may be voice-enabled such that the user 108 may issue an utterance including a command to activate the HVAC system 112, and the electronic device 106 is able to respond appropriately (e.g., performing speech processing and/or coordinating with a remote, cloud-based speech processing system, etc.).

The electronic device 106 may transition from the inactivated-relay state 302 into the activated-relay state 312 by causing the first switch 124 in the first circuit path 122 to close, and causing the second switch(es) 128 and third switch(es) 134 to open the second circuit path 126 and the third circuit path 132. In this way, the first switch 124 creates a dead short in the control circuit 114 so that all (or nearly all) of the available power from the first power source 116 is provided to the relay 120 to energize the relay 120. For instance, the voltage placed across the relay 120, and the amount of current ($I_2$) 314 flowing through the relay 120, may be such that an amount of power delivered to the relay 120 surpasses the energizing threshold to cause the relay 120 to close (e.g., pull legs of a contactor of the relay), thereby closing a circuit in which the HVAC system 112 (or other power load) is connected, thereby allowing the second power source 118 to power the HVAC system 112. Stated otherwise, the relay 120 may enter the activated-relay state 312 in order to close a circuit such that the HVAC equipment 112 turns on.

FIG. 3C illustrates a system-architecture diagram of an example environment 300C in which the electronic device 106 performs power-stealing techniques in the control circuit 114 when the relay 120 is in the third state (an activated-relay-maintenance state 316). For clarity, the first circuit path 122 is grayed-out in FIG. 3C, because in this third configuration no current flows through the first circuit path 122.

In some instances, subsequent to causing the relay 120 to enter the activated-relay state 312, the electronic device 106 may cause the relay 120 to enter the activated-relay-maintenance state 316, in which the control circuit 114 is configured to perform power stealing. To transition into the activated-relay-maintenance state 316, the electronic device 106 may cause the first switch 124 to open, and cause the second switch(es) 128 to close, while the third switch(es) 132 remain in their second positions, such that the second circuit path 126 is closed and the third circuit path 132, which includes the components of the electronic device 106, is connected in parallel with the second circuit path 126. In this way, an voltage may be placed across the voltage drop 130, as well as the components 138 of the electronic device 106, such that current is "stolen" or harvested from the control circuit 114 by the electronic device 106 while the relay 120 is in the activated-relay-maintenance state 316.

The voltage drop 130 may be implemented using various components configured to generate a voltage drop across nodes. For instance, the voltage drop may include two Zener diodes in series with opposite orientations. The Zener diodes generally have forward conduction and reverse conduction voltage. For instance, when a Zener diode is reverse biased, it will have a clamping voltage of the Zener rating (e.g., 3 volts, 5 volts, etc.). When the Zener diode is forward biased, there may be a standard 0.7 volt drop. Accordingly, when two Zener diodes are placed in opposite directions and in series, the drop across the Zeners will include a drop from one diode in reverse bias and another voltage drop across the other Zener diode of the standard drop. In some examples, an AC wave that is placed across the Zener diodes may output a clamped, square-wave output voltage.

As illustrated, the two Zener diodes 322 and 324 may be placed in parallel with a resistor 326 to help prevent crossover distortion. For instance, the output waveform from the Zener diodes may include some dead time, or a time period where the voltage is at zero volts, or near zero volts. This may result in zero current conduction, which may be problematic for the relay 120 as there would be no voltage across the relay 120, which may cause chatter. Accordingly, the resistor in parallel with the two Zener diodes may smooth out the cross-over distortion.

However, the voltage drop 130 may comprise different components than those illustrated in FIG. 3C. For instance, the voltage drop 130 may comprise a triac, AC switching components, or even a full PWM where more or less power is drawn during certain parts of the sine wave. However, any other type of circuit or component may be used that is configurable to serve as the voltage drop 130.

By placing the voltage drop 130 in parallel with the device components 138 in the third circuit path 132, the device components 138 are provided with the same voltage as that placed across the voltage drop 130. In this way, the voltage drop 130 may cause an amount of current ($I_{3A}$) 318 to flow through the second circuit path 126, and the voltage placed across the device components 138 may cause an current ($I_{3B}$) 320 to flow through the third circuit path 132. The current ($I_{3A}$) 318 and the current ($I_{3B}$) 320 may then combine to be current (I) 322 that flows through the relay 120 to maintain the activated-relay-maintenance state 316 of the relay 120, while allowing the electronic device 106 to harvest energy from the first power source 116.

In some examples, the amount of power used to maintain the activated-relay-maintenance state 316 of the relay 120 is less than the amount of power used to initially energize or activate the relay 120. Accordingly, in the activated-relay-maintenance state 316, the amount of power consumed by the electronic device 106 may be small enough such that the relay 120 is able to maintain the activated-relay-maintenance state 316 to close the power circuit for the power load (e.g., HVAC system 112). In this way, the electronic device 106 may be able to power one or more of the device components 138, including recharging the rechargeable battery 140 used as an internal power supply for the electronic device 106.

In some examples, the electronic device 106 may monitor the amount of AC current (I3) 322 being provided to the relay 120, such as by using the current-sense resistor 136. The electronic device 106 may include logic to determine, based on the amount of current ($I_3$) 322 being provided to the relay 120, that the electronic device 106 may consume additional power, or should consume less power, to maintain the activated-relay-maintenance state 316 of the relay 120. For instance, if the amount of current ($I_3$) 322 is falling and in danger of falling below a threshold amount of current for maintaining the activated state of the relay 120, the electronic device 106 may use the current limiter 306 to reduce the amount of current ($I_{3B}$) 320 being drawn by the electronic device 106. Similarly, if the amount of current ($I_3$) 322 provided to the relay 120 is more than sufficient to maintain the activated-relay-maintenance state 316, the electronic device 106 may cause the current limiter 306 to allow additional current ($I_{3B}$) 320 to be consumed by the components of the electronic device 106. In this way, the electronic device 106 may be configured to intelligently vary the amount of power that is harvested from the control circuit 114.

Figure 4:
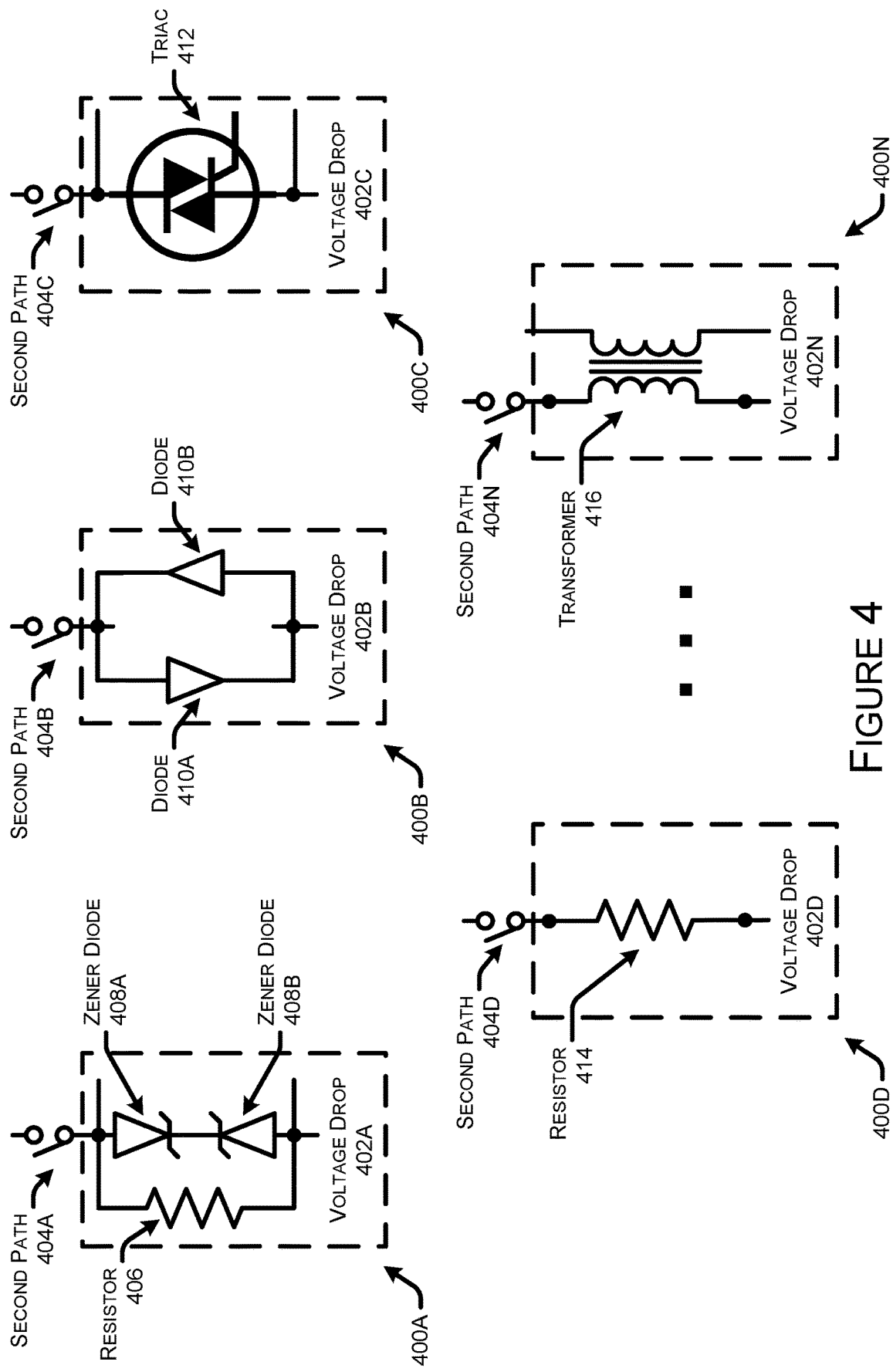
FIG. 4 illustrates example illustrations of voltage-drop circuitry that may be used to provide a voltage drop in the electronic device.

FIG. 4 illustrates example illustrations of voltage-drop circuitry that may be used to provide a voltage drop in the electronic device. While various illustrations are shown as being used for voltage drop circuitry, additional or alternative circuitry or components may be used to implement a voltage drop.

As shown, voltage-drop circuitry 400A illustrates a voltage drop 402A implemented in the second path 404A. The voltage drop 402A may correspond to voltage drop 130 and include a resistor in parallel with two Zener diodes 408A and 408B. As described herein, the Zener diodes 408A and 408B may comprise semiconductor devices that allow current to flow in either a forward or reverse direction. The Zener diodes 408 may comprise of a heavily doped p-n junction, designed to conduct in the reverse direction when a certain specified voltage is reached. That is, the Zener diodes 408 generally have forward conduction and reverse conduction voltage. For instance, when a Zener diode 408A is reverse biased, it will have a clamping voltage of the Zener rating (e.g., 3 volts, 5 volts, etc.). When the Zener diode 408B is forward biased, there may be a standard 0.7 volt drop. Accordingly, when two Zener diodes 408 are placed in opposite directions and in series, a voltage drop across the Zener diodes 408 will include a drop from one diode in reverse bias and another voltage drop across the other Zener diode of the standard drop. In some examples, an AC wave that is placed across the Zener diodes may output a clamped, square-wave output voltage. The resistor 406 may be placed in parallel with the two Zener diodes 408 to smooth out the flat spots of the output voltage waveform, as described in more detail above.

As shown, voltage-drop circuitry 400B illustrates a voltage drop 402B implemented in the second path 404B. The voltage drop 402B may correspond to voltage drop 130 and include two diodes 410A and 410B. As noted above, the voltage drop across each diode 410A and 410B may comprise 0.6V, 0.7V, etc. When the diode 410A is forward biased, or has a forward voltage, the voltage drop across the diode 410A is around 0.6V, 0.7V, etc. Similarly, when the diode 410B is forward biased, or has a forward voltage, the voltage drop across the diode 410B is around 0.6V, 0.7V, etc. In this way, for an AC voltage waveform, the diodes 410A and 410B alternate between forward and reverse bias to result in a voltage drop of 0.6V, 0.7V, or the like.

As shown, voltage-drop circuitry 400C illustrates a voltage drop 402C implemented in the second path 404C. The voltage drop 402C may correspond to voltage drop 130 and include a Triac 412. The Triac 412 may comprise a three terminal electrical component that conducts current in either direction when triggered, and may be a bidirectional triode thyristor or bilateral triode thyristor. The Triac 412 may have bidirectionally such that the Triac 412 may be triggered into conduction by both positive and negative voltages applied to its Anode with both positive and negative pulses applied to its Gate terminal making it a two-quadrant switching Gate controlled device. Generally, when the Triac 412 is triggered, the Triac 412 may have a nominal voltage across it (e.g., 0.8V).

As shown, voltage-drop circuitry 400D illustrates a voltage drop 402D implemented in the second path 404D. The voltage drop 402D may correspond to voltage drop 130 and include one or more resistors 414. Generally, a resistor 414 may comprise a passive two-terminal electrical component that implements an electrical resistance as a circuit element. The voltage drop 402D across the resistor 414 is proportional to the current (e.g., voltage (V) is proportional to a product of the resistance of the resistor (R) and the current (I) (or V=RI)). Accordingly, the resistor may be sized for the electronic device 106 to produce a voltage drop 402D based on a value of the current flowing through the second patch 404D.

As shown, voltage-drop circuitry 400N illustrates a voltage drop 402N implemented in the second path 404N. The voltage drop 402N may correspond to voltage drop 130 and include a transformer 416 to produce the voltage drop 402N. Generally, a transformer 416 may comprise a passive electrical device that uses magnetic flux in coils of the circuit to increase or decrease the input voltage as compared to an output voltage for the transfer 416. The voltage drop 402N may comprise a voltage drop across the resistive and reactive components of the transformer's 416 primary side due to the current flowing through the second circuit path 404N.

Figure 5:
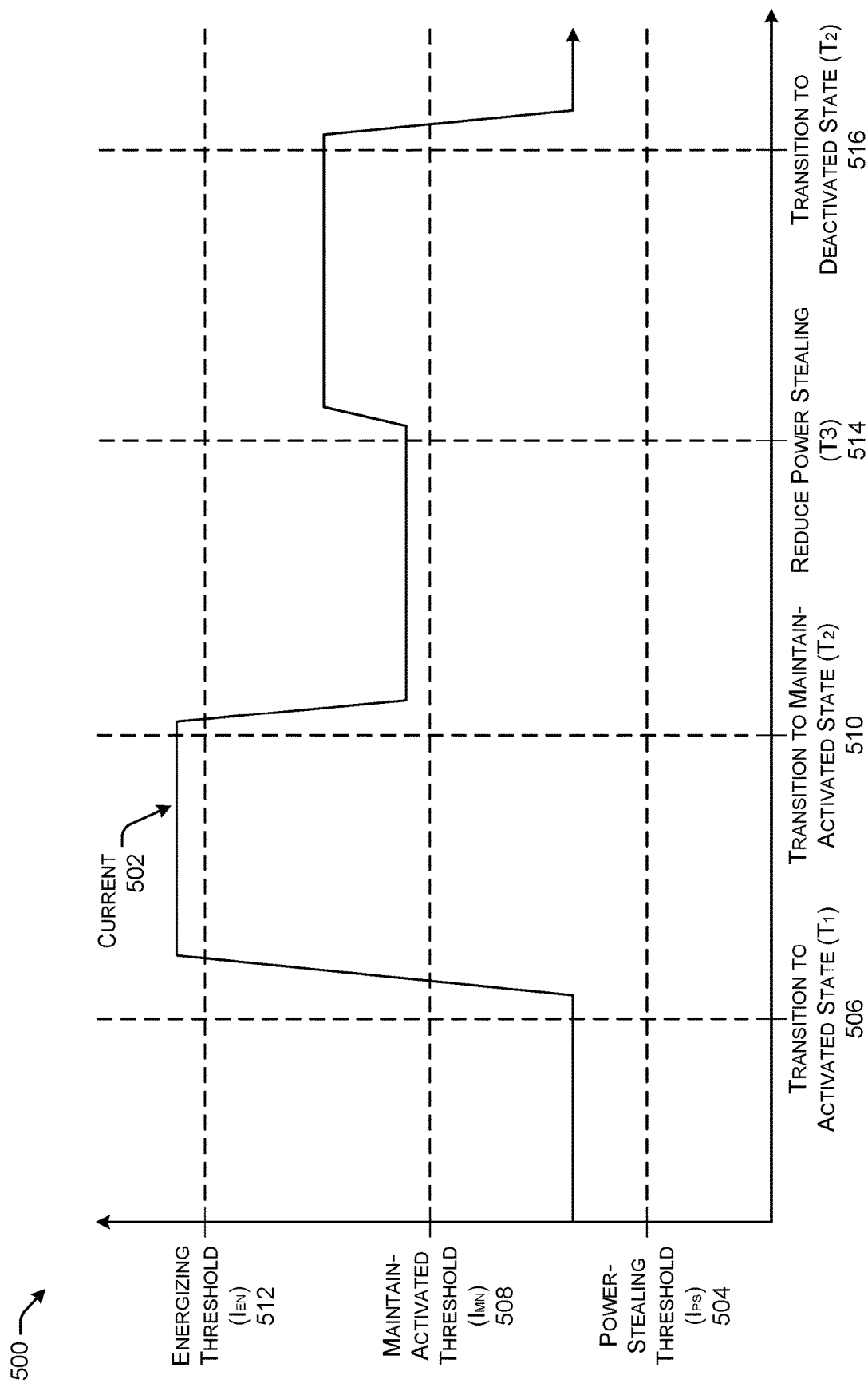
FIG. 5 illustrates an example diagram in which an amount of current flowing in a control circuit changes based on a control circuit that includes a relay transitioning through various states.

FIG. 5 illustrates an example diagram 500 in which an amount of current 502 flowing in the control circuit 114 changes based on the relay 120 transitioning through various states. As illustrated, the current 502 may initially be flowing above a power-stealing threshold ($I_{PS}$) 504 of the electronic device 106. When the current 502 is flowing above the power-stealing threshold ($I_{PS}$) 504, then the electronic device 106 is receiving enough current to power the device components 138, such as recharging the rechargeable battery 140. In some examples, the electronic device 106 may determine to transition to the activated state ($T_1$) 506. For instance, the electronic device 106 may receive input 110 indicating that the relay 120 is to activate to turn on the HVAC system 112. To transition at 506, the electronic device 106 may cause the first switch 124 to close and the second switch(es) 128 and third switch(es) 134 (if included) to open.

As illustrated, the current 502 that is being provided to the relay 120 may rise above the energizing threshold ($I_{EN}$) 512. For instance, all or nearly all of the voltage provided by the first power source 116 may be placed across the relay 120, which causes the relay 120 to draw the current 502 at more than the energizing threshold ($I_{EN}$) 512 of the relay 120 to activate the relay 120.

The electronic device 106 may determine, subsequent to activating the relay 120, to transition the control circuit 114 to a maintain-activated state ($T_2$) 510. For instance, the electronic device 106 may cause the first switch 124 to open, and cause the second switch(es) 128 to close such that the voltage drop 130 causes a voltage to be placed across the voltage drop 130 and the device components 138. In some examples, the amount of current 502 drawn may drop below the energizing threshold 512, but stay above a maintain-activated threshold 508 for maintaining the relay 120 in the activated state. In this example, it may require more current 502 to initially activate the relay 120 than to maintain the activated state (e.g., 512 versus 508).

In some examples, the electronic device 106 may determine that an amount of current 502 being drawn for power stealing is too much, and reduce the power stealing at 514. For instance, the electronic device 106 may use the current-sense resistor 136 (or other component) to determine that the amount of current 502 is too close to falling below the maintain-activated threshold 508, and use the current limiter 206 to reduce the power stealing for the electronic device 106 and drive up the amount of current 502 provided to the relay 120.

Finally, after determining that the relay 120 has been activated for a long enough period of time (e.g., the temperature within the physical location 102 has reached the desired temperature), the electronic device 106 may determine to transition the relay 120 to the inactivated state 202 at 516. In such examples, the electronic device 106 may cause the second switch(es) 128 to open, and cause the third switch(es) 134 (if included) to close to place the device components 138 in series with the first power source 116. In this state, the device components 138 may perform power-stealing techniques by remaining below the maintain-activated threshold 508, but above the power-stealing threshold 504 so that a small amount of the current 502 may be harvested.

FIGS. 6 and 7 illustrate flow diagrams of example methods 600 and 700 that illustrate aspects of the functions performed at least partly by the electronic device 106 as described in this disclosure. The logical operations described herein with respect to FIGS. 1-5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for the electronic device 106 to transition the control circuit 114 including the relay 120 from a first state in which the relay 120 is inactive, and the electronic device 106 is performing power-stealing into a second state where the relay 120 is activated and the electronic device 106 is unable to perform power-stealing. Further, the method 400 may include the electronic device 106 transitioning the control circuit 114 into a third state where the relay 120 is maintaining the active state while the electronic device 106 is performing power-stealing techniques.

In some examples, the electronic device 106 may be configured to be connected in series with the relay 120 and an AC power source 116. The electronic device 106 may comprise a first circuit path 122 connected to a first node 127 in the circuit 114 to which the AC power source 116 is connected and a second node 129 in the circuit 114 to which the relay 120 is connected. In some examples, the first circuit path 122 comprises a first switch 124 being selectively configured to open to prevent AC current from flowing through the first circuit path 122 and close such that the AC power source 116 is in series with the relay 120 in the circuit 114. Further, the electronic device 106 may comprise a second circuit path 126 connected in parallel with the first circuit path 122 where the second circuit path includes one or more second switches 128 configured to be connected to at least one of the first node or the second node and voltage-drop circuitry 130. The one or more second switches 128 may be selectively configured to open to prevent AC current from the AC power source 116 from flowing through the second circuit path 126 and close to allow AC current to flow through the second circuit path 126. Further, the second circuit path 126 may comprise the voltage-drop circuitry 130 connected in series with the one or more second switches 128 where the voltage-drop circuitry 130 is configured to receive AC current from the AC power source 116 and generate a voltage drop. Further, the electronic device 106 may include a third circuit path 132 connected in parallel with the first circuit path 122 and the second circuit path 126 where the third circuit path 132 comprises one or more third switches 134 being selectively configured to open to cause the third circuit path 132 to be in parallel with the first circuit path 122 and second circuit path 126 and close to cause the third circuit path 132 to be in parallel with the voltage drop circuitry 130. Additionally, the electronic device 106 may include a power load (e.g., device components 138) that is in series with the one or more third switches 134.

The electronic device 106 may include one or more processors, and one or more computer-readable media storing computer-executable instructions that, when executed by the one or more processors, cause the electronic device to perform the steps of method 600.

At 602, the electronic device may cause the first switch to open to prevent AC current from flowing through the first circuit path 122. For instance, the electronic device 106 may cause the first switch 124 to open to prevent AC current from flowing through the first circuit path 122.

At 604, the electronic device may cause the one or more second switches to open to prevent AC current from flowing through the second circuit path. For instance, the electronic device 106 may cause the one or more second switches 128 to open to prevent AC current from flowing through the second circuit path 126.

At 606, the electronic device may cause the first switch to close such that a second amount of AC current flows through the first circuit path and the AC relay. For instance, the electronic device 106 may cause the first switch 124 to close such that a second amount of AC current flows through the first circuit path 122. In some examples, the second amount of AC current may be above an energizing threshold 312 of the AC relay 120.

At 608, the electronic device may cause the first switch to open to prevent AC current from flowing through the first circuit path. For example, the electronic device 106 may cause the first switch 124 to open to prevent AC current from flowing through the first circuit path 122.

At 610, the electronic device may cause the one or more second switches to close to result in an AC voltage placed across the voltage-drop circuitry and the power load. For instance, the electronic device 106 may cause the one or more second switches 128 to close to result an AC voltage placed across the voltage-drop circuitry 130 and the power load of the electronic device 106. The third amount of AC current flowing out of the second circuit path and the third circuit path, and through the AC relay 120, may maintain the AC relay in the active state.

FIG. 7 illustrates a flow diagram of an example method 700 for the electronic device 106 to transition the relay 120 from an first state during which the electronic device 106 is unable to power steal from the control circuit 114 while the relay 120 is activated into a second state during which the electronic device 106 is able to power steal while the activated state of the relay 120 is maintained.

At 702, an electronic device may determine to activate a relay in a circuit where the relay is in the circuit with the electronic device and a power source. For example, the electronic device 106 may determine to activate a relay 120 in a circuit 114 where the relay 120 is in the circuit 114 with the electronic device 106 and a power source 116.

At 704, the electronic device may cause a first switch connected in series with the relay in a first circuit path of the electronic device to close, such that a first amount of current flows from the power source through the relay in the circuit, wherein the first amount of current causes the relay to enter an activated state. For example, the electronic device 106 may cause a first switch 124, in a first circuit path 122 of the electronic device 106, to close such that a first amount of current flows from the power source 116 through the first circuit path 122 to the relay 120 in the circuit 114, wherein the first amount of current causes the relay 120 to enter an activated state.

At 706, the electronic device may, subsequent to the relay entering the activated state, cause the first switch to open to prevent current from flowing through the first circuit path. For instance, the electronic device 106 may, subsequent to the relay entering the activated state, cause the first switch 124 to open to prevent current from flowing through the first circuit path 122.

At 708, the electronic device may cause a second switch, connected in series with the relay in a second circuit path of the electronic device, to close such that a second amount of current flows from the power source through the second circuit path to result in an voltage across first and second nodes in the second circuit path, and a third amount of current flows from the power source through a third circuit path in the electronic device and is connected in parallel with the second circuit path.

Figure 8:
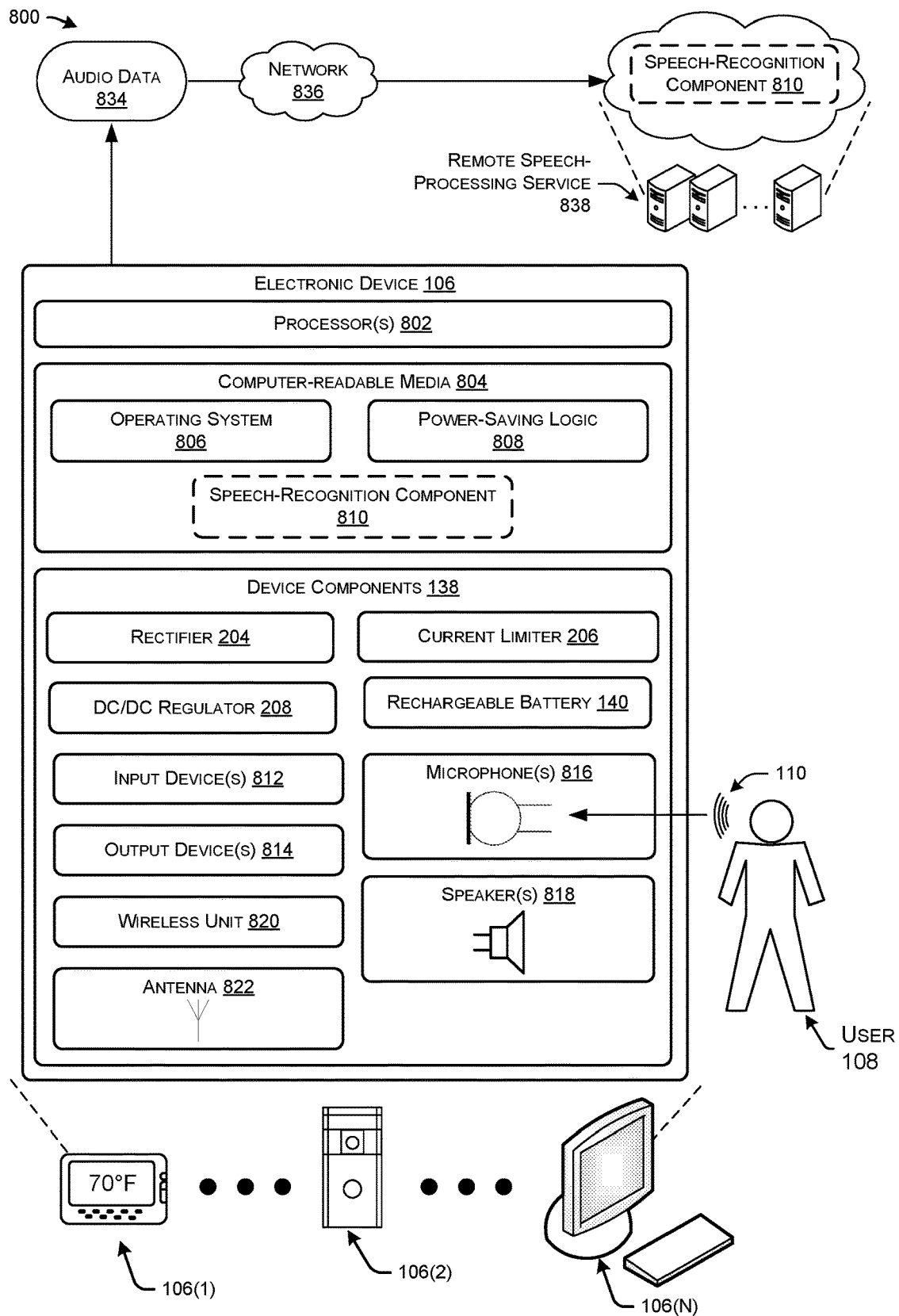
FIG. 8 illustrates a component diagram of example components of an electronic device configured for performing power-stealing techniques in a power-control circuit.

FIG. 8 illustrates a component diagram 800 of example components of the electronic device 106 configured for performing power-stealing techniques in the control circuit 114.

In the illustrated implementation, the electronic device 106 includes one or more processors 802 and computer-readable media 804. In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems.

The computer-readable media 804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 804 may be implemented as computer-readable storage media ("CRSM"), which may be any available physical media accessible by the processor(s) 802 to execute instructions stored on the memory 804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 802.

Several modules such as instruction, datastores, and so forth may be stored within the computer-readable media 804 and configured to execute on the processor(s) 802. A few example functional modules are shown as applications stored in the computer-readable media 804 and executed on the processor(s) 802, although the same functionality may alternatively be implemented in hardware, firmware, or as a system on a chip (SOC).

An operating system module 806 may be configured to manage hardware and services within and coupled to the device 104 for the benefit of other modules. In addition, in some instances the electronic device 106 may include power-saving logic 808 (e.g., computer-executable instructions, firmware, software, etc.) configured to perform the techniques described herein. For instance, the power-saving logic 808 may, when executed by the processor(s) 802, cause the electronic device to perform techniques described herein.

The electronic device 106 may further including, in some instances, a speech-recognition component 810 that employs any number of conventional speech processing techniques such as use of speech recognition, natural language understanding, and extensive lexicons to interpret voice input. In some instances, the speech-recognition component 810 may simply be programmed to identify the user uttering a predefined word or phrase (i.e., a "wake word"), after which the electronic device 106 may begin uploading audio signals to a remote speech-processing service 838 for more robust speech-recognition processing. In other examples, the electronic device 106 itself may, for example, identify voice commands from users 108 and may provide indications of these commands to the remote speech-processing service 838.

The electronic device 106 may further include the device components 138 described herein, such as the rectifier 204, current limiter 206, DC/DC regulator 208, and/or rechargeable battery 140.

Further, the electronic device 106 has input devices 812 and output devices 814. The input devices 812 may include a keyboard, keypad, mouse, touch screen, joystick, control buttons, capacitive sensor, scroll wheel, etc. In some implementations, one or more microphones 816 may function as input devices 812 to receive audio input, such as user voice input 110. The output devices 814 may include a display, a light element (e.g., LED), or the like. In some implementations, one or more speakers 818 may function as output devices 814 to output audio sounds.

A user 108 may interact with the electronic device 106 by speaking to it, and the one or more microphone(s) 816 captures the user's speech. The electronic device 106 can communicate back to the user 108 by emitting audible statements through the speaker 818. In this manner, the user 108 can interact with the electronic device 106 solely through speech, without use of a keyboard or display.

The electronic device 106 may further include a wireless unit 820 coupled to an antenna 822 to facilitate a wireless connection to a network 836. The wireless unit 820 may implement one or more of various wireless technologies, such as Wi-Fi, Bluetooth, RF, and so on.

The electronic device 106 may be a thermostat, smart doorbell, and/or any type of computing device described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by an electronic device connected to a power load, the method comprising:
receiving, at the electronic device, input including an instruction to activate the power load;
causing a first amount of current to flow from a power source and to a relay that actives the power load, the first amount of current being greater than or equal to an upper threshold amount of current associated with the relay entering an activated state;
subsequent to the relay entering the activated state, causing a second amount of current to flow from the power source through a first circuit path and to the relay; and
causing a third amount of current to flow from the power source through a second circuit path of the electronic device that includes a rechargeable battery that is charged by the third amount of current,
wherein the second amount of current and the third amount of current comprises a total amount of current flowing through the relay that is greater than a lower threshold amount of current for maintaining the relay in the activated state.

2. The method of claim 1, further comprising:
determining to inactivate the relay; and
causing the first circuit path to open such that the second circuit path that is connected in series with the power source and the relay, wherein a fourth amount of current flows through the relay, and the fourth amount of current is less than the upper threshold amount of current for activating the relay.

3. The method of claim 1, further comprising:
detecting that the total amount of current flowing through the relay increased to greater than a third threshold amount of current; and
increasing the third amount of current drawn by the second circuit path to a fourth amount of current.

4. The method of claim 1, further comprising:
detecting that the total amount of current flowing through the relay is less than a fourth threshold amount of current; and
decreasing the third amount of current drawn by the second circuit path to a fourth amount of current.

5. The method of claim 1, wherein the second circuit path further includes:
a rectifier configured to convert AC current into DC current;
a current-limiter component connected in series with the rectifier and configured to restrict an amount of DC current received from the rectifier; and
a DC/DC regulator configured to receive the amount of DC current from the current-limiter component and provide an output DC voltage for the rechargeable battery.

6. The method of claim 1, wherein:
the first circuit path and second circuit path are in parallel;
the first circuit path includes voltage-drop circuitry that generates a voltage drop across the first circuit path and the second circuit path; and
the voltage drop causes the third amount of current to flow through the second circuit path and charge the rechargeable battery.

7. The method of claim 6, wherein the voltage-drop circuitry comprises:
a first Zener diode having a cathode connected to a second Zener diode;
the second Zener diode having a cathode connected to the first Zener diode; and
at least a resistor connected in parallel with the first Zener diode and the second Zener diode.

8. The method of claim 6, wherein the voltage-drop circuitry comprises:
a first diode in parallel with a second diode such that an anode of the first diode is connected to a cathode of the second diode;
a Triode for AC (TRIAC); or
a transformer.

9. The method of claim 1, wherein:
the electronic device is a thermostat that includes the rechargeable battery;
the power load is at least one of a heating system or a cooling system; and
the input received at the thermostat includes an instruction to activate the heating system or the cooling system.

10. A system configured to be connected to a relay and a power source, the system comprising:
a rechargeable battery;
one or more processors; and
one or more computer-readable media storing computer-executable instructions that, when executed by the one or more processors, cause the one or more processors to perform operations comprising:
determining to activate the relay that activates a power load;
causing a first amount of current to flow from the power source and to the relay that actives a power load, the first amount of current being greater than or equal to an upper threshold amount of current associated with the relay entering an activated state;
subsequent to the relay entering the activated state, diverting a second amount of current, from the first amount of current, through a circuit path of the system that includes the rechargeable battery that is charged by the second amount of current,
wherein the second amount of current is consumed by the rechargeable battery such that a third amount of current is provided to the relay, the third amount of current being greater than a lower threshold amount of current for maintaining the relay in the activated state.

11. The system of claim 10, wherein the circuit path is a first circuit path of the system, further comprising:
voltage-drop circuitry disposed in a second circuit path that is in parallel with the first circuit path;
wherein diverting the second amount of current from the first amount of current comprises:
causing a third amount of current to flow through the second circuit path such that the voltage-drop circuitry generates a voltage drop across the first circuit path and the second circuit path.

12. The system of claim 10, wherein the circuit path further includes:
a rectifier configured to convert AC current into DC current;
a current-limiter component connected in series with the rectifier and configured to restrict an amount of DC current received from the rectifier; and
a DC/DC regulator configured to receive the amount of DC current from the current-limiter component and provide an output DC voltage for the rechargeable battery.

13. An electronic device configured to be connected to a relay and a power source, the electronic device comprising:
   a rechargeable battery;
   one or more processors; and
   one or more computer-readable media storing computer-executable instructions that, when executed by the one or more processors, cause the one or more processors to perform operations comprising:
      determining to activate the relay that activates a power load;
      causing a first amount of current to flow from a power source and to a relay that actives the power load, the first amount of current being greater than or equal to an upper threshold amount of current associated with the relay entering an activated state;
      subsequent to the relay entering the activated state, causing a second amount of current to flow from the power source through a first circuit path and to the relay; and
      causing a third amount of current to flow from the power source through a second circuit path of the electronic device that includes a rechargeable battery that is charged by the third amount of current,
      wherein the second amount of current and the third amount of current comprises a total amount of current flowing through the relay that is greater than a lower threshold amount of current for maintaining the relay in the activated state.

14. The electronic device of claim 13, the operations further comprising:
   determining to inactivate the relay; and
   causing the first circuit path to open such that the second circuit path that is connected in series with the power source and the relay, wherein a fourth amount of current flows through the relay, and the fourth amount of current is less than the upper threshold amount of current for activating the relay.

15. The electronic device of claim 13, the operations further comprising:
   detecting that the total amount of current flowing through the relay increased to greater than a third threshold amount of current; and
   increasing the third amount of current drawn by the second circuit path to a fourth amount of current.

16. The electronic device of claim 13, the operations further comprising:
   detecting that the total amount of current flowing through the relay is less than a fourth threshold amount of current; and
   decreasing the third amount of current drawn by the second circuit path to a fourth amount of current.

17. The electronic device of claim 13, wherein the second circuit path further includes:
   a rectifier configured to convert AC current into DC current;
   a current-limiter component connected in series with the rectifier and configured to restrict an amount of DC current received from the rectifier; and
   a DC/DC regulator configured to receive the amount of DC current from the current-limiter component and provide an output DC voltage for the rechargeable battery.

18. The electronic device of claim 13, wherein:
   the first circuit path and second circuit path are in parallel;
   the first circuit path includes voltage-drop circuitry that generates a voltage drop across the first circuit path and the second circuit path; and
   the voltage drop causes the third amount of current to flow through the second circuit path and charge the rechargeable battery.

19. The electronic device of claim 18, wherein the voltage-drop circuitry comprises:
   a first Zener diode having a cathode connected to a second Zener diode;
   the second Zener diode having a cathode connected to the first Zener diode; and
   at least a resistor connected in parallel with the first Zener diode and the second Zener diode.

20. The electronic device of claim 18, wherein the voltage-drop circuitry comprises:
   a first diode in parallel with a second diode such that an anode of the first diode is connected to a cathode of the second diode;
   a Triode for AC (TRIAC); or
   a transformer.

* * * * *